US011961493B2

(12) United States Patent
Lee et al.

(10) Patent No.: US 11,961,493 B2
(45) Date of Patent: Apr. 16, 2024

(54) DISPLAY DEVICE, AND METHOD OF OPERATING A DISPLAY DEVICE

(71) Applicant: SAMSUNG DISPLAY CO., LTD., Yongin-si (KR)

(72) Inventors: Jinho Lee, Hwaseong-si (KR); Seunghwan Park, Anyang-si (KR); Youngwoon Choi, Seoul (KR); Sungjae Park, Seongnam-si (KR); Seungho Park, Suwon-si (KR); Kitae Yoon, Seoul (KR); Namjae Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/943,296

(22) Filed: Sep. 13, 2022

(65) Prior Publication Data

US 2023/0154436 A1 May 18, 2023

(30) Foreign Application Priority Data

Nov. 16, 2021 (KR) ........................ 10-2021-0157564

(51) Int. Cl.
*G09G 5/10* (2006.01)
*G09G 3/3233* (2016.01)

(52) U.S. Cl.
CPC ......... *G09G 5/10* (2013.01); *G09G 2310/027* (2013.01); *G09G 2320/0276* (2013.01);
(Continued)

(58) Field of Classification Search
CPC ............... G09G 5/10; G09G 2310/027; G09G 2320/0276; G09G 2320/0285;
(Continued)

(56) References Cited

U.S. PATENT DOCUMENTS

2014/0001975 A1* 1/2014 Lee .................... H05B 45/3725 315/224
2016/0203618 A1* 7/2016 Li .......................... H04N 21/00 345/591
(Continued)

FOREIGN PATENT DOCUMENTS

KR 10-2013-0012762 2/2013
KR 10-2013-0035032 4/2013
(Continued)

*Primary Examiner* — Antonio Xavier
(74) *Attorney, Agent, or Firm* — F. Chau & Associates, LLC

(57) ABSTRACT

A display device including: a display panel including first through N-th pixel rows; and a panel driver configured to sequentially receive first through N-th line data for the first through the N-th pixel rows in each frame period, and to drive the display panel based on the first through the N-th line data, the panel driver including: a current control circuit configured to determine a current control value for a (K+1)-th pixel row based on the first through K-th line data for the first through K-th pixel rows received in a current frame period and (K+1)-th through the N-th line data for the (K+1)-th through the N-th pixel rows received in a previous frame period; and a data correction circuit configured to correct the (K+1)-th line data for the (K+1)-th pixel row based on the current control value in the current frame period.

19 Claims, 15 Drawing Sheets

(52) U.S. Cl.
CPC . *G09G 2320/0285* (2013.01); *G09G 2340/16* (2013.01); *G09G 2360/16* (2013.01)

(58) Field of Classification Search
CPC ........... G09G 2340/16; G09G 2360/16; G09G 3/3233; G09G 3/3283; G09G 5/001; G09G 2320/0271; G09G 2320/0626
See application file for complete search history.

(56) References Cited

U.S. PATENT DOCUMENTS

| | | | | |
|---|---|---|---|---|
| 2020/0219448 | A1* | 7/2020 | Okamoto | G09G 3/3258 |
| 2022/0122556 | A1* | 4/2022 | Meng | G09G 3/2003 |
| 2023/0144029 | A1* | 5/2023 | Lee | G06V 10/60 345/77 |

FOREIGN PATENT DOCUMENTS

| | | |
|---|---|---|
| KR | 10-2014-0071728 | 6/2014 |
| KR | 10-2015-0015235 | 2/2015 |
| KR | 10-2044133 | 11/2019 |
| KR | 10-2020-0015292 | 2/2020 |

* cited by examiner

DISPLAY DEVICE, AND METHOD OF OPERATING A DISPLAY DEVICE

CROSS-REFERENCE TO RELATED APPLICATION(S)

This application claims priority under 35 U.S.C. § 119 to Korean Patent Application No. 10-2021-0157564, filed on Nov. 16, 2021 in the Korean Intellectual Property Office (KIPO), the disclosure of which is incorporated by reference herein in its entirety.

1. TECHNICAL FIELD

Embodiments of the present inventive concept relate to display devices, and more particularly to display devices controlling currents, and methods of operating the display devices.

2. DESCRIPTION OF THE RELATED ART

A display device may include a display panel and a display panel driver to produce an image based on image data. The display device may employ a current control technique to prevent an overcurrent in the display device. The current control technique may determine a current control value by analyzing current frame data, and may apply the current control value when the display device displays an image based on next frame data. Thus, a frame delay may exist between determining the current control value and applying the current control value. Accordingly, when a low gray image (e.g., a black image) is displayed in a previous frame period, and a high gray image (e.g., a white image) is displayed in a current frame period, a current control value corresponding to the low gray image may be applied in the current frame period, rather than a current control value corresponding to the high gray image, and thus, the overcurrent may occur.

SUMMARY

Some embodiments of the present inventive concept provide a display device capable of controlling a current on a line-by-line basis.

Some embodiments of the present inventive concept provide a method of operating a display device capable of controlling a current on a line-by-line basis.

According to embodiments of the present inventive concept, there is provided a display device including: a display panel including first through N-th pixel rows, where N is an integer greater than 1; and a panel driver configured to sequentially receive first through N-th line data for the first through the N-th pixel rows in each frame period, and to drive the display panel based on the first through the N-th line data, the panel driver including: a current control circuit configured to determine a current control value for a (K+1)-th pixel row based on the first through K-th line data for the first through K-th pixel rows received in a current frame period and (K+1)-th through the N-th line data for the (K+1)-th through the N-th pixel rows received in a previous frame period, where K is an integer greater than 0 and less than or equal to N; and a data correction circuit configured to correct the (K+1)-th line data for the (K+1)-th pixel row based on the current control value in the current frame period.

The current control circuit is configured to: determine an average panel luminance level based on the first through the K-th line data received in the current frame period and the (K+1)-th through the N-th line data received in the previous frame period; and determine the current control value based on the average panel luminance level.

The current control circuit decreases the current control value as the average panel luminance level increases.

The current control circuit includes: a gray-luminance converter configured to convert gray levels represented by pixel data included in the first through N-th line data for the first through the N-th pixel rows into pixel luminances for each of the first through the N-th pixel rows; a line luminance calculator configured to calculate a line luminance for each of the first through the N-th pixel rows by summing the pixel luminances for each of the first through the N-th pixel rows; an average luminance level determiner configured to store line luminances for the first through the N-th pixel rows in a first-in first-out (FIFO) manner, and to determine an average panel luminance level based on the line luminances for the first through the N-th pixel rows; a luminance domain scale factor determiner configured to determine a luminance domain scale factor corresponding to the average panel luminance level; and a gray domain scale factor determiner configured to convert the luminance domain scale factor into a gray domain scale factor as the current control value.

The gray-luminance converter converts a gray level represented by each pixel data into a pixel luminance by using an equation 350 "PXLUM=(Gray)^Gamma", where PXLUM represents the pixel luminance, Gray represents the gray level, and Gamma represents a gamma value of the display device.

The gray-luminance converter includes a gray-luminance lookup table that stores a plurality of pixel luminances corresponding to a plurality of gray levels, and wherein the gray-luminance converter converts a gray level represented by each pixel data into a pixel luminance by using the gray-luminance lookup table.

The average luminance level determiner includes: a FIFO memory configured to store the line luminances for the first through the N-th pixel rows, the FIFO memory configured to remove a previous line luminance for a current pixel row stored in the previous frame period while storing a current line luminance for the current pixel row in the current frame period; and an average luminance level calculator configured to calculate a panel luminance by summing the line luminances stored in the FIFO memory, and to determine the average panel luminance level by dividing the panel luminance by a maximum panel luminance.

The luminance domain scale factor determiner is configured to: determine the luminance domain scale factor as a maximum luminance domain scale factor when the average panel luminance level is less than a reference luminance level; and decrease the luminance domain scale factor as the average panel luminance level increases when the average panel luminance level is greater than or equal to the reference luminance level.

The gray domain scale factor determiner converts the luminance domain scale factor into the gray domain scale factor by using an equation 550 "GDSF=(LDSF)^(1/Gamma)", where GDSF represents the gray domain scale factor, LDSF represents the luminance domain scale factor, and Gamma represents a gamma value of the display device.

The gray domain scale factor determiner includes a luminance-gray scale factor lookup table that stores a plurality of gray domain scale factors corresponding to a plurality of luminance domain scale factors, and wherein the gray domain scale factor determiner converts the luminance domain scale factor into the gray domain scale factor by using the luminance-gray scale factor lookup table.

The data correction circuit is configured to: receive a gray domain scale factor as the current control value; and multiply pixel data included in the (K+1)-th line data by the gray domain scale factor to correct the (K+1)-th line data.

The current control circuit is configured to: calculate a scaled panel luminance based on line luminances for the first through the N-th pixel rows and luminance domain scale factors for the first through the N-th pixel rows; compare the scaled panel luminance with a panel luminance limit value; and decrease the current control value when the scaled panel luminance exceeds the panel luminance limit value.

In a case where the scaled panel luminance exceeds the panel luminance limit value when the K-th line data are received, the current control circuit determines the current control values for the (K+1)-th through the N-th pixel rows in the current frame period as a minimum current control value.

In a case where the scaled panel luminance exceeds the panel luminance limit value when the K-th line data are received, the current control circuit decreases the current control values for the (K+1)-th through the N-th pixel rows in the current frame period to a target current control value.

The current control circuit includes a gray-luminance converter configured to convert gray levels represented by pixel data included in the first through N-th line data for the first through the N-th pixel rows into pixel luminances for each of the first through the N-th pixel rows; a line luminance calculator configured to calculate a line luminance for each of the first through the N-th pixel rows by summing the pixel luminances for each of the first through the N-th pixel rows; an average luminance level determiner configured to store line luminances for the first through the N-th pixel rows in a first-in first-out (FIFO) manner, and to determine an average panel luminance level based on the line luminances for the first through the N-th pixel rows; a luminance domain scale factor determiner configured to determine a luminance domain scale factor corresponding to the average panel luminance level; a scaled panel luminance calculator configured to multiply the line luminances for the first through the N-th pixel rows by luminance domain scale factors for the first through the N-th pixel rows, respectively, and to calculate a scaled panel luminance by summing results of the multiplication; an overcurrent protector configured to compare the scaled panel luminance with a panel luminance limit value, and to decrease the luminance domain scale factor output from the luminance domain scale factor determiner when the scaled panel luminance exceeds the panel luminance limit value; and a gray domain scale factor determiner configured to convert the luminance domain scale factor output from the overcurrent protector into a gray domain scale factor as the current control value.

According to embodiments of the present inventive concept, there is provided a display device including: a display panel including first through N-th pixel rows, where N is an integer greater than 1; and a panel driver configured to sequentially receive first through N-th line data for the first through the N-th pixel rows in each frame period, and to drive the display panel based on the first through the N-th line data, the panel driver including: a current control circuit configured to determine an average panel luminance level based on the first through K-th line data for the first through K-th pixel rows received in a current frame period and (K+1)-th through the N-th line data for (K+1)-th through the N-th pixel rows received in a previous frame period, and to determine a scale factor for the (K+1)-th pixel row based on the average panel luminance level, where K is an integer greater than 0 and less than or equal to N; and a data correction circuit configured to correct the (K+1)-th line data for the (K+1)-th pixel row based on the scale factor in the current frame period.

The current control circuit decreases the scale factor as the average panel luminance level increases.

The data correction circuit multiplies pixel data included in the (K+1)-th line data by the scale factor to correct the (K+1)-th line data.

According to embodiments of the present inventive concept, there is provided a method of operating a display device, the method including: receiving K-th line data for a K-th pixel row among first through N-th pixel rows in a current frame period, where N is an integer greater than 1, and K is an integer greater than 0 and less than or equal to N; determining a current control value for a (K+1)-th pixel row based on first through the K-th line data for the first through the K-th pixel rows received in the current frame period and (K+1)-th through N-th line data for the (K+1)-th through the N-th pixel rows received in a previous frame period; receiving the (K+1)-th line data for the (K+1)-th pixel row among the first through the N-th pixel rows in the current frame period; correcting the (K+1)-th line data based on the current control value in the current frame period; and driving the (K+1)-th pixel row based on the corrected (K+1)-th line data.

The method further including: calculating a scaled panel luminance based on line luminances for the first through the N-th pixel rows and luminance domain scale factors for the first through the N-th pixel rows; comparing the scaled panel luminance with a panel luminance limit value; and decreasing the current control value when the scaled panel luminance exceeds the panel luminance limit value.

According to embodiments of the present inventive concept, there is provided a display device including: a display panel including a plurality of pixel rows arranged in sequence; and a panel driver configured to sequentially receive a plurality of line data for the pixel rows in each frame period, and to drive the display panel based on the line data, the panel driver including: a current control circuit configured to determine a current control value for a specific pixel row based on line data received for the pixel rows arranged before the specific pixel row in a current frame period, line data received for the specific pixel row in a previous frame period and line data received for pixel rows arranged after the specific pixel row in the previous frame period; and a data correction circuit configured to correct the line data for the specific pixel row based on the current control value in the current frame period.

As described above, in a display device and a method of operating the display device according to embodiments of the present inventive concept, when K-th line data for a K-th pixel row are received, a current control value for a (K+1)-th pixel row may be determined based on first through K-th line data received in a current frame period and (K+1)-th through N-th line data received in a previous frame period, and (K+1)-th line data may be corrected based on the current control value. Accordingly, an overcurrent caused by a delay between determining the current control value and applying the current control value may be prevented.

BRIEF DESCRIPTION OF THE DRAWINGS

Illustrative, non-limiting embodiments of the present inventive concept will be more clearly understood from the following detailed description in conjunction with the accompanying drawings.

DETAILED DESCRIPTION OF THE EMBODIMENTS

Hereinafter, embodiments of the present inventive concept will be explained in detail with reference to the accompanying drawings.

Figure 1:
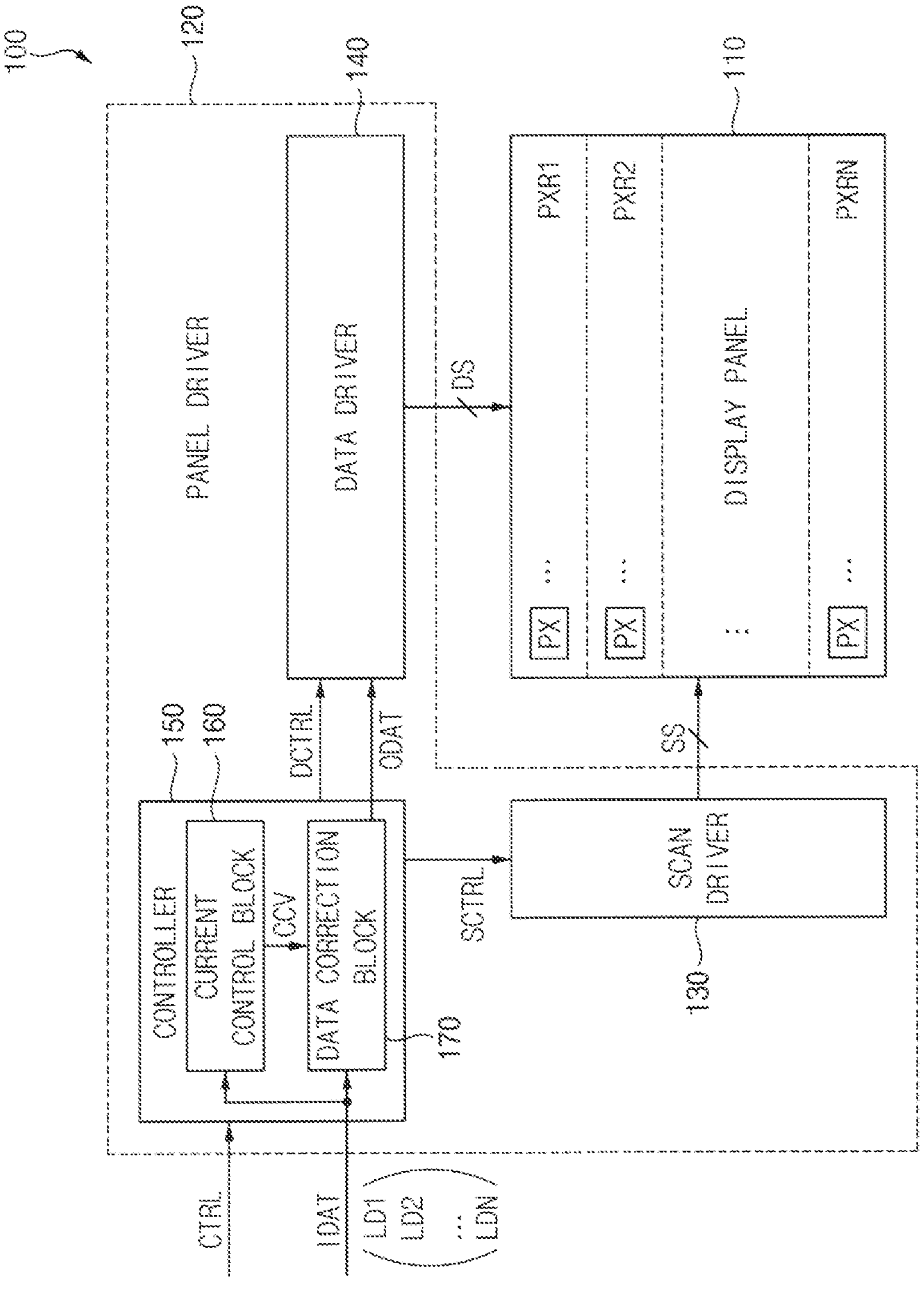
FIG. 1 is a block diagram illustrating a display device according to embodiments of the present inventive concept.

FIG. 1 is a block diagram illustrating a display device according to embodiments of the present inventive concept, and FIC 2 is a diagram for describing an example of an operation of a display device according to embodiments of the present inventive concept.

Referring to FIG. 1, a display device 100 may include a display panel 110 that includes a plurality of pixels PX, and a panel driver 120 that drives the display panel 110 based on input image data IDAT. In some embodiments of the present inventive concept, the panel driver 120 may include a scan driver 130 that provides scan signals SS to the plurality of pixels PX, a data driver 140 that provides data signals DS to the plurality of pixels PX, and a controller 150 that controls the scan driver 130 and the data driver 140.

The display panel 110 may include first through N-th pixel rows PXR1, PXR2, . . . , PXRN each including the plurality of pixels PX, where N is an integer greater than 1. Here, each pixel row PXR1, PXR2, . . . , PXRN may be the same row of the pixels PX, and may be one line or one row of the pixels PX receiving the same scan signal SS. In some embodiments of the present inventive concept, each pixel PX may include at least two transistors, at least one capacitor and a light emitting element, and the display panel 110 may be a light emitting display panel. For example, the light emitting element may be an organic light emitting diode (OLED), and the display panel 110 may be an OLED display panel. In other examples, the light emitting element may be a light emitting diode (LED), a quantum dot (QD) light emitting diode, a micro light emitting diode, an inorganic light emitting diode, or any other light emitting element. In other embodiments of the present inventive concept, each pixel PX may include a switching transistor, and a liquid crystal capacitor coupled to the switching transistor, and the display panel 110 may be a liquid crystal display (LCD) panel. However, the display panel 110 is not limited to the light emitting display panel and the LCD panel, and may be any other display panel.

The scan driver 130 may generate the scan signals SS based on a scan control signal SCTRL received from the controller 150, may sequentially provide the scan signals SS to the plurality of pixels PX on a pixel row basis. In some embodiments of the present inventive concept, the scan control signal SCTRL may include, but is not limited to, a scan start signal and a scan clock signal. In some embodiments of the present inventive concept, the scan driver 130 may be integrated or formed in a peripheral region of the display panel 110. In other embodiments of the present inventive concept, the scan driver 130 may be implemented with one or more integrated circuits.

The data driver 140 may generate the data signals DS based on output image data ODAT and a data control signal DCTRL received from the controller 150, and may provide the data signals DS to the plurality of pixels PX. In some embodiments of the present inventive concept, the data control signal DCTRL may include, but is not limited to, a horizontal start signal and a load signal. In some embodiments of the present inventive concept, the data driver 140 and the controller 150 may be implemented with a single integrated circuit, and the single integrated circuit may be referred to as a timing controller embedded data driver (TED). In other embodiments of the present inventive concept, the data driver 140 and the controller 150 may be implemented with separate integrated circuits.

The controller 150 (e.g., a timing controller (TCON)) may receive input image data IDAT and a control signal CTRL from an external host processor (e.g., an application processor (AP), a graphics processing unit (GPU), a graphics card, etc.). The input image data IDAT may include first through N-th line data LD1, LD2, . . . , LDN for the first through the N-th pixel rows PXR1, PXR2, . . . , PXRN, and the controller 150 may sequentially receive the first through the N-th line data LD1 through LDN in each frame period. In some embodiments of the present inventive concept, the control signal CTRL may include, but is not limited to, a vertical synchronization signal, a horizontal synchronization signal, an input data enable signal, a master clock signal, etc. The controller 150 may generate the output image data ODAT, the data control signal DCTRL and the scan control signal SCTRL based on the input image data IDAT and the control signal CTRL. The controller 150 may control an operation of the data driver 140 by providing the output image data ODAT and the data control signal DCTRL to the data driver 140, and may control an operation of the scan driver 130 by providing the scan control signal SCTRL to the scan driver 130.

In the display device 100, the panel driver 120 may sequentially receive the first through the N-th line data LD1 through LDN for the first through the N-th pixel rows PXR1 through PXRN in each frame period, and may perform a current control operation on a line-by-line basis or a pixel row-by-pixel row basis. In some embodiments of the present inventive concept, the panel driver 120 may generate a current control value CCV for next line data when current line data are received, and may correct the next line data based on the current control value CCV To perform this operation, the controller 150 of the panel driver 120 may include a current control block 160 and a data correction block 170. The current control block 160 and the data correction block 170 may each be implemented in a circuit.

Figure 2:
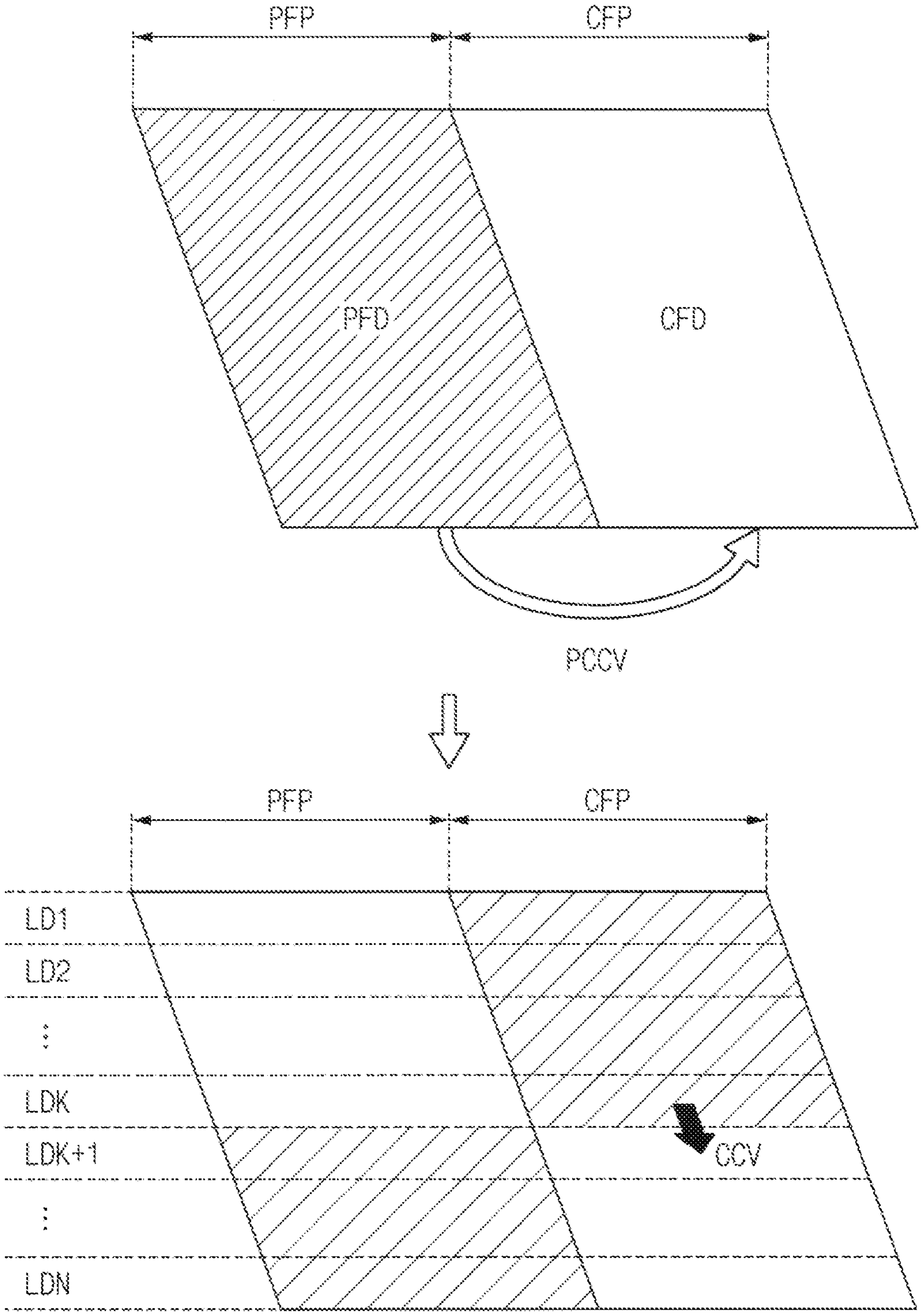
FIG. 2 is a diagram for describing an example of an operation of a display device according to embodiments of the present inventive concept.

The current control block 160 may generate the current control value CCV for the next line data when the current line data are received. For example, as illustrated in FIG. 2, when K-th line data LDK for a K-th pixel row among the first through the N-th pixel rows PXR1 through PXRN are received in a current frame period CFP, where K is an integer greater than 0 and less than or equal to N, the current control block 160 may determine the current control value CCV for the (K+1)-th pixel row based on the first through K-th line data LD1, LD2, . . . , LDK for the first through K-th pixel rows PXR1, PXR2, . . . received in the current frame period CFP and (K+1)-th through the N-th line data LDK+1, . . . , LDN for the (K+1)-th through the N-th pixel rows . . . , PXRN received in a previous frame period PFP. In other words, the current control value CCV for a particular pixel row is determined based on line data up to that pixel row in the current frame period CFP and line data after that pixel row in a previous frame period PFP. In some embodiments of the present inventive concept, the current control block 160 may determine an average panel luminance level based on the first through the K-th line data LD1, LD2, . . . , LDK received in the current frame period CFP and the (K+1)-th through the N-th line data LDK+1, . . . , LDN received in the previous frame period PEP, and may determine the current control value CCV based on the average panel luminance level. Further, in some embodiments of the present inventive concept, the current control block 160 may decrease the current control value CCV as the average panel luminance level increases. In the alternative, the current control block 160 may increase the current control value CCV as the average panel luminance level decreases.

In some embodiments of the present inventive concept, as described below with reference to FIGS. 11 through 17, the current control block 160 may calculate a scaled panel luminance based on line luminances for the first through the N-th pixel rows PXR1 through PXRN and luminance domain scale factors for the first through the N-th pixel rows PXR1 through PXRN, and may compare the scaled panel luminance with a panel luminance limit value. When the scaled panel luminance exceeds the panel luminance limit value, the current control block 160 may decrease the current control value CCV In the alternative, when the scaled panel luminance does not exceed the panel luminance limit value, the current control block 160 may increase the current control value CCV, In some embodiments of the present inventive concept, when the scaled panel luminance exceeds the panel luminance limit value when the K-th line data LDK are received, the current control block 160 may determine the current control values CCV for the (K+1)-th through the N-th pixel rows . . . , PXRN in the current frame period CFP as a minimum current control value (e.g., about 0). In other words, the current control block 160 may determine a minimum current control value based on the current control values CCV for the line data after the K-th line data LDK in the current frame. In other embodiments of the present inventive concept, when the scaled panel luminance exceeds the panel luminance limit value when the K-th line data LDK are received, the current control block 160 may gradually decrease the current control values CCV for the (K+1)-th through the N-th pixel rows . . . , PXRN in the current frame period CFP to a target current control value (e.g., about 0.2).

The data correction block 170 may correct the (K+1)-th line data LDK+1 for the (K+1)-th pixel row based on the current control value CCV in the current frame period CFP. In some embodiments of the present inventive concept, the data correction block 170 may receive a gray domain scale factor as the current control value CCV from the current control block 160, and may multiply pixel data included in the (K+1)-th line data LDK+1 by the gray domain scale factor to correct the (K+1)-th line data LDK+1. For example, the current control value CCV, or the gray domain scale factor may be greater than or equal to 0 and less than or equal to 1, and the corrected (K+1)-th line data LDK+1 may be decreased compared with the original (K+1)-th line data LDK+1. Thus, a current of the (K+1)-th pixel row driven based on the corrected (K+1)-th line data LK+1 may be decreased compared with a current of the (K+1)-th pixel row driven based on the original (K+1)-th line data LDK+1.

In a conventional display device, a current control operation is performed with a period (or cycle) of one frame on a frame-by-frame basis. For example, as illustrated in FIG. 2, a current control value PCCV may be determined based on previous frame data PFD in a previous frame period PFP, and the current control value PCCV determined based on the previous frame data PFD may be applied to current frame data CFD in a current frame period CFP. Thus, in the conventional display device, a frame delay may exist between determining the current control value PCCV and applying the current control value PCCV. Accordingly, when a low gray image (e.g., a black image) is displayed in the previous frame period PFP, and a high gray image (e.g., a white image) is displayed in the current frame period CFP, the current control value PCCV corresponding to the low gray image may be applied in the current frame period CFP, rather than a current control value corresponding to the high gray image, and thus, an overcurrent or a rush current may occur. However, in the display device 100 according to embodiments of the present inventive concept, the current control operation may be performed with a period (or cycle) of one line or one pixel row on a line-by-line basis or a pixel row-by-pixel row basis. In other words, the current control value CCV for next line data LDK+1 may be determined when the current line data LDK are received, and the current control value CCV may be applied to the next line data LDK+1. Thus, in the display device 100 according to embodiments of the present inventive concept, there may be a delay of only one line or only one pixel row between determining the current control value CCV and applying the current control value CCV Accordingly, in the display device 100 according to embodiments of the present inventive concept, even if a dedicated frame memory is not used, the overcurrent or the rush current caused by the delay between determining the current control value CCV and applying the current control value CCV may be prevented.

According to an embodiment of the present inventive concept, there is provided a display device 100 including: a display panel 110 including first through N-th pixel rows (PXR1-PXRN), where N is an integer greater than 1; and a panel driver 120 configured to sequentially receive first through N-th line data (LD1-LDN) for the first through the N-th pixel rows (PXR1-PXRN) in each frame period, and to drive the display panel 110 based on the first through the N-th line data (LD1-LDN), the panel driver 120 including: a current control block (or circuit) 160 configured to determine a current control value CCV for a (K+1)-th pixel row based on the first through K-th line data for the first through K-th pixel rows received in a current frame period CFP and (K+1)-th through the N-th line data for the (K+1)-th through the N-th pixel rows received in a previous frame period PFP, where K is an integer greater than 0 and less than or equal to N; and a data correction block (or circuit) 170 configured to correct the (K+1)-th line data for the (K+1)-th pixel row based on the current control value CCV in the current frame period CFP.

Figure 3:
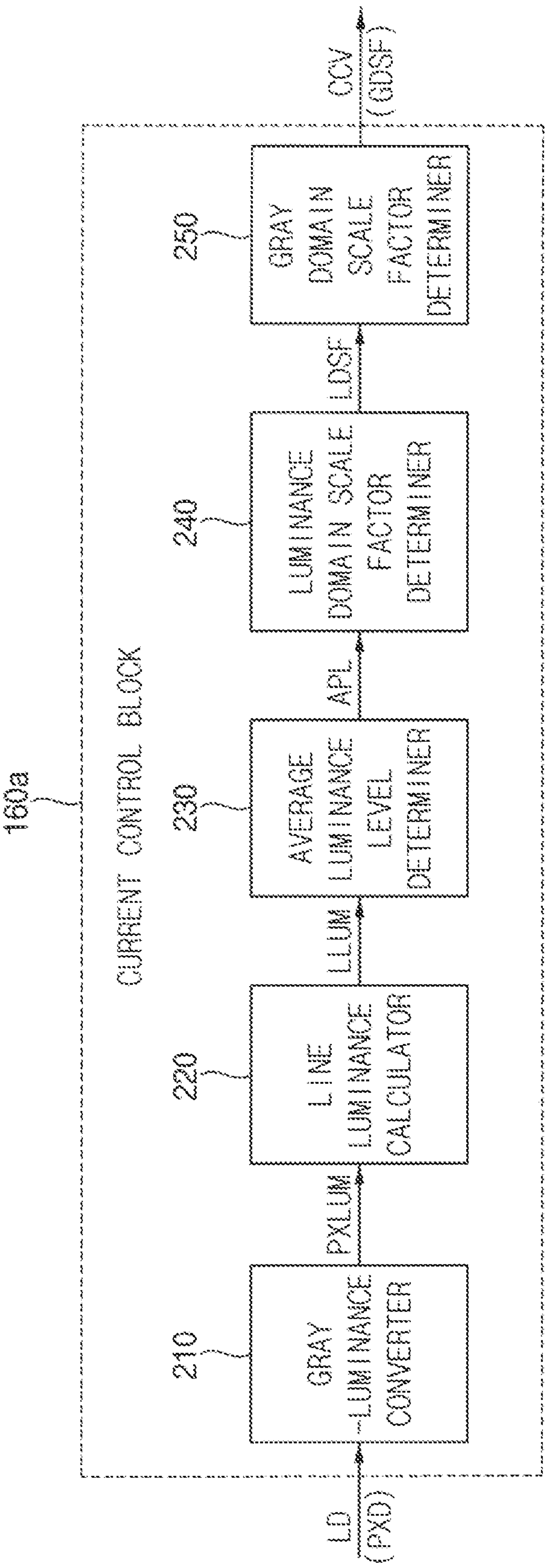
FIG. 3 is a block diagram illustrating a current control block according to embodiments of the present inventive concept.
Figure 4:
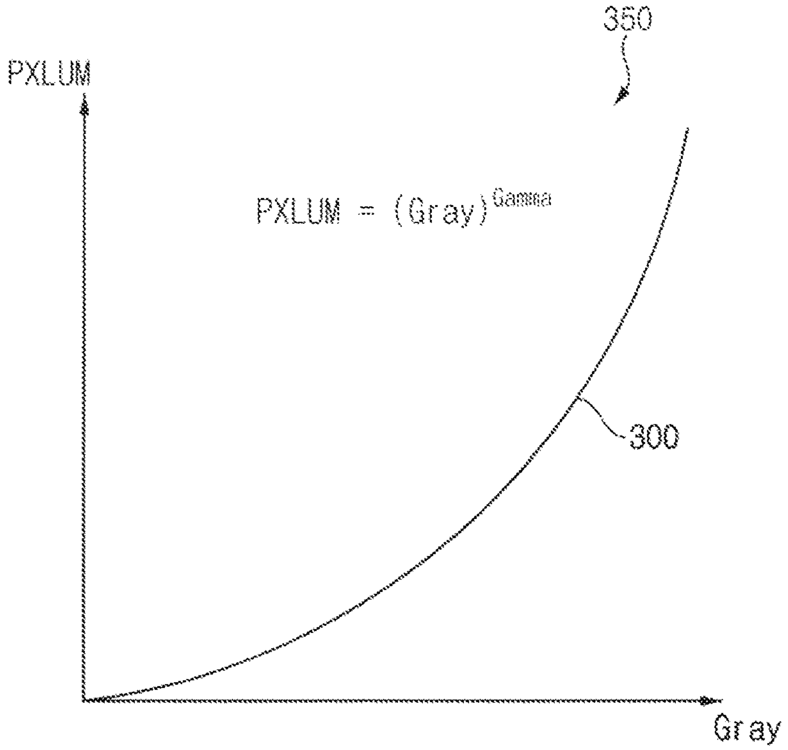
FIG. 4 is a diagram for describing an example of an operation of a gray-luminance converter.
Figure 5:
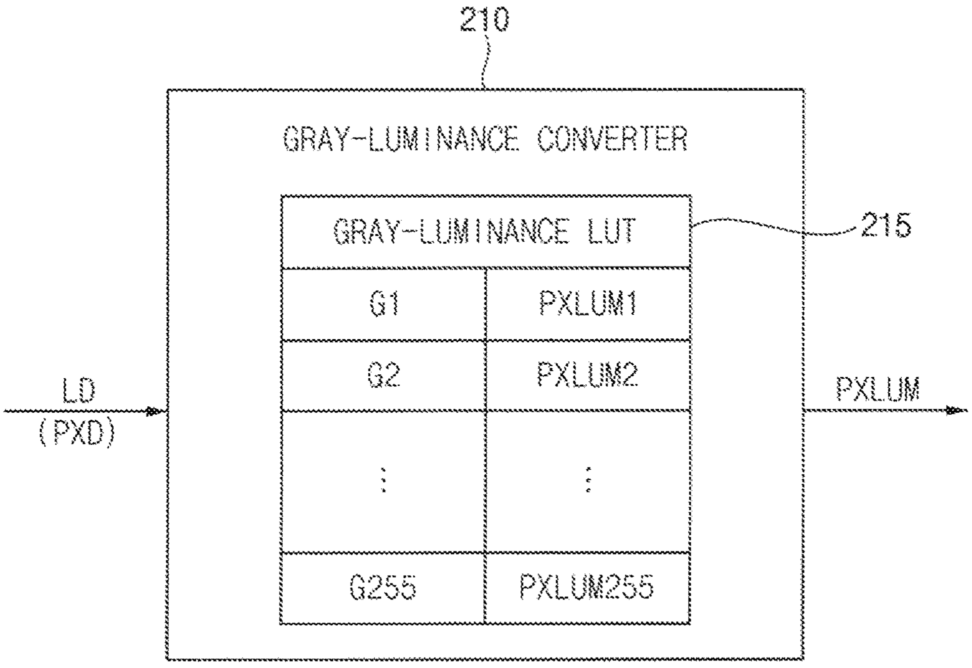
FIG. 5 is a block diagram illustrating an example of a gray-luminance converter.
Figure 6:
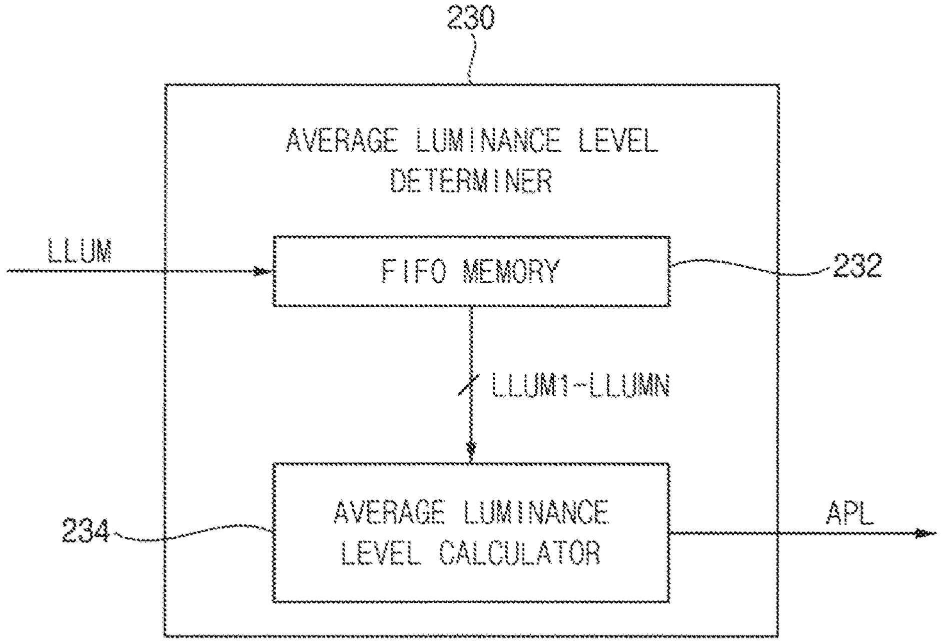
FIG. 6 is a block diagram illustrating an example of an average luminance level determiner.
Figure 7:
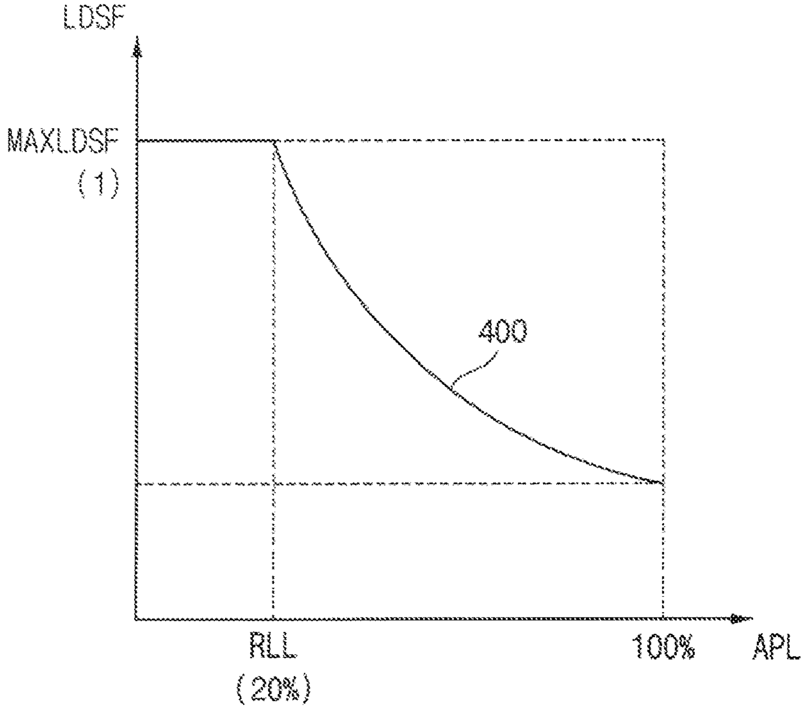
FIG. 7 is a diagram for describing an example of an operation of a luminance domain scale factor determiner.
Figure 8:
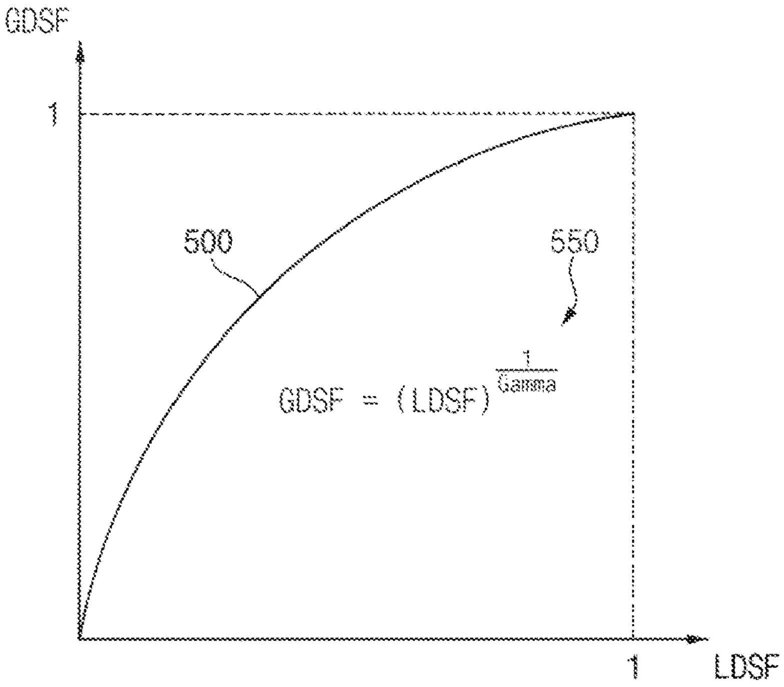
FIG. 8 is a diagram for describing an example of an operation of a gray domain scale factor determiner.
Figure 9:
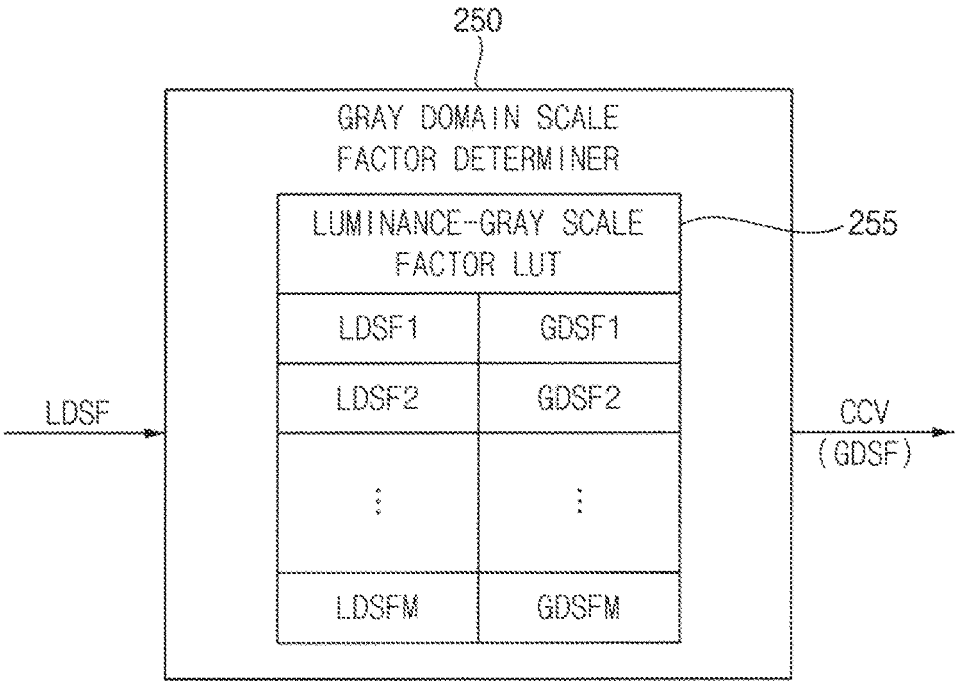
FIG. 9 is a block diagram illustrating an example of a gray domain scale factor determiner.

FIG. 3 is a block diagram illustrating a current control block according to embodiments of the present inventive concept, FIG. 4 is a diagram for describing an example of an operation of a gray-luminance converter, FIG. 5 is a block diagram illustrating an example of a gray-luminance converter, FIG. 6 is a block diagram illustrating an example of an average luminance level determiner, FIG. 7 is a diagram for describing an example of an operation of a luminance domain scale factor determiner, FIG. 8 is a diagram for describing an example of an operation of a gray domain scale factor determiner, and FIG. 9 is a block diagram illustrating an example of a gray domain scale factor determiner.

Referring to FIG. 3, a current control block 160*a* may include a gray-luminance converter 210, a line luminance calculator 220, an average luminance level determiner 230, a luminance domain scale factor determiner 240 and a gray domain scale factor determiner 250. Each component of the current control block 160*a* may be implemented in a circuit.

The gray-luminance converter 210 may convert gray levels represented by pixel data PXD included in line data LD for each pixel row into pixel luminances PXLUM for each pixel row. FIG. 4 illustrates an example of a curve 300 of the pixel luminance PXLUM according to the gray level Gray. In some embodiments of the present inventive concept, as illustrated in FIG. 4, the gray-luminance converter 210 may convert a gray level Gray represented by each pixel data PXD into a pixel luminance PXLUM by using an equation "PXLUM (Gray)^Gamma", where PXLUM represents the pixel luminance, Gray represents the gray level, and Gamma represents a gamma value of a display device. For example, the gamma value Gamma may be, but is not limited to, about 2.2.

In other embodiments of the present inventive concept, as illustrated in FIG. 5, the gray-luminance converter 210 may include a gray-luminance lookup table (LUT) 215 that stores a plurality of pixel luminances PXLUM1, PXLUM2, . . . , PXLUM255 corresponding to a plurality of gray levels G1, G2, . . . , G255. For example, the gray-luminance LUT 215 may store, but is not limited to, two hundred fifty five pixel luminances PXLUM1, PXLUM2, . . . , PXLUM255 respectively corresponding to two hundred fifty five gray levels from a 1-gray level G1 to a 255-gray level G255. The gray-luminance converter 210 may convert the gray level represented by each pixel data PXD into the pixel luminance PXLUM by using the gray-luminance LUT 215.

The line luminance calculator 220 may calculate a line luminance LLUM for each pixel row by summing the pixel luminances PXLUM for each pixel row. Since first through N-th line data for first through N-th pixel rows are sequentially received, the line luminance calculator 220 may sequentially calculate first through N-th line luminances LLUM for the first through the N-th line data, and may sequentially output the first through the N-th line luminances LLUM.

The average luminance level determiner 230 may store the line luminances LLUM for the first through the N-th pixel rows in a first-in first-out (FIFO) manner. For example, the average luminance level determiner 230 may sequentially receive and store the N line luminances LLUM for the first through the N-th pixel rows, and may maintain the N line luminances LLUM by removing the oldest line luminance LLUM while storing newest line luminance LLUM. Further, the average luminance level determiner 230 may determine an average panel luminance level APL based on the N line luminances LLUM for the first through the N-th pixel rows. In some embodiments of the present inventive concept, the average panel luminance level APL may be referred to as an average picture level.

In some embodiments of the present inventive concept, as illustrated in FIG. 6, the average luminance level determiner 230 may include a FIFO memory 232 that stores the N line luminances LLUM1 through LLUMN for the first through the N-th pixel rows, and an average luminance level calculator 234 that determines the average panel luminance level APL based on the N line luminances LLUM11 through LLUMN. To store the N line luminances LLUM1 through LLUMN in the FIFO manner, the FIFO memory 232 may remove a previous line luminance LLUM for a current pixel row stored in a previous frame period while storing a current line luminance LLUM for the current pixel row in a current frame period. The average luminance level calculator 234 may calculate a panel luminance by summing the N line luminances LLUM1 through LLUMN stored in the FIFO memory 232. Further, the average luminance level calculator 234 may determine the average panel luminance level APL by dividing the panel luminance by a maximum panel luminance. For example, the maximum panel luminance may be, but is not limited to, a luminance of a display panel when the pixel data PXD for all pixels represent the maximum gray level, for example a 255-gray level. Further, the average panel luminance level APL may have, but is not limited to, a percentage value from about 0% to about 100%.

The luminance domain scale factor determiner 240 may determine a luminance domain scale factor LDSF corresponding to the average panel luminance level APL. For example, the luminance domain scale factor determiner 240 may decrease the luminance domain scale factor LDSF as the average panel luminance level APL increases. In the alternative, the luminance domain scale factor determiner 240 may increase the luminance domain scale factor LDSF as the average panel luminance level APL decreases. Further, the luminance domain scale factor LDSF determined by the luminance domain scale factor determiner 240 may have, but is not limited to, a value greater than or equal to 0 and less than or equal to 1.

In some embodiments of present inventive concept, as illustrated in FIG. 7, the luminance domain scale factor determiner 240 may determine the luminance domain scale factor LDSF as a maximum luminance domain scale factor MAXLDSF when the average panel luminance level APL is less than a reference luminance level RLL. For example, the reference luminance level RLL may be, but is not limited to, about 20%, and the maximum luminance domain scale factor MAXLDSF may be, but is not limited to, 1. Further, when the average panel luminance level APL is greater than or equal to the reference luminance level RLL, the luminance domain scale factor determiner 240 may decrease the luminance domain scale factor LDSF as the average panel luminance level APL increases.

The gray domain scale factor determiner 250 may receive the luminance domain scale factor LDSF from the luminance domain scale factor determiner 240, may convert the luminance domain scale factor LDSF into a gray domain scale factor GDSF, and may output the gray domain scale factor GDSF as the current control value CCV. In some embodiments of the present inventive concept, the current control value CCV, or the gray domain scale factor GDSF may have a value greater than or equal to 0 and less than or equal to 1. FIG. 8 illustrates an example of a curve 500 of the gray domain scale factor GDSF according to the luminance domain scale factor LDSF. In some embodiments of the present inventive concept, as illustrated in FIG. 8, the gray domain scale factor determiner 250 may convert the luminance domain scale factor LDSF into the gray domain scale factor GDSF by using an equation "GDSF=(LDSF)^(1/Gamma)", where GDSF represents the gray domain scale factor, LDSF represents the luminance domain scale factor, and Gamma represents the gamma value of the display device.

In other embodiments of the present inventive concept, as illustrated in FIG. 9, the gray domain scale factor determiner 250 may include a luminance-gray scale factor LUT 255 that stores a plurality of gray domain scale factors GDSF1, GDSF2, . . . , GDSFM corresponding to a plurality of luminance domain scale factors LDSF1, LDSF2, . . . LDSFM. For example, the luminance-gray scale factor LUT 255 may store, but is not limited to, M gray domain scale factors GDSF1, GDSF2, . . . , GDSFM respectively corresponding to M luminance domain scale factors LDSF1, LDSF2, . . . LDSFM, where M is an integer greater than 1. The gray domain scale factor determiner 250 may convert the luminance domain scale factor LDSF into the gray domain scale factor GDSF by using the luminance-gray scale factor LUT 255.

Figure 10:
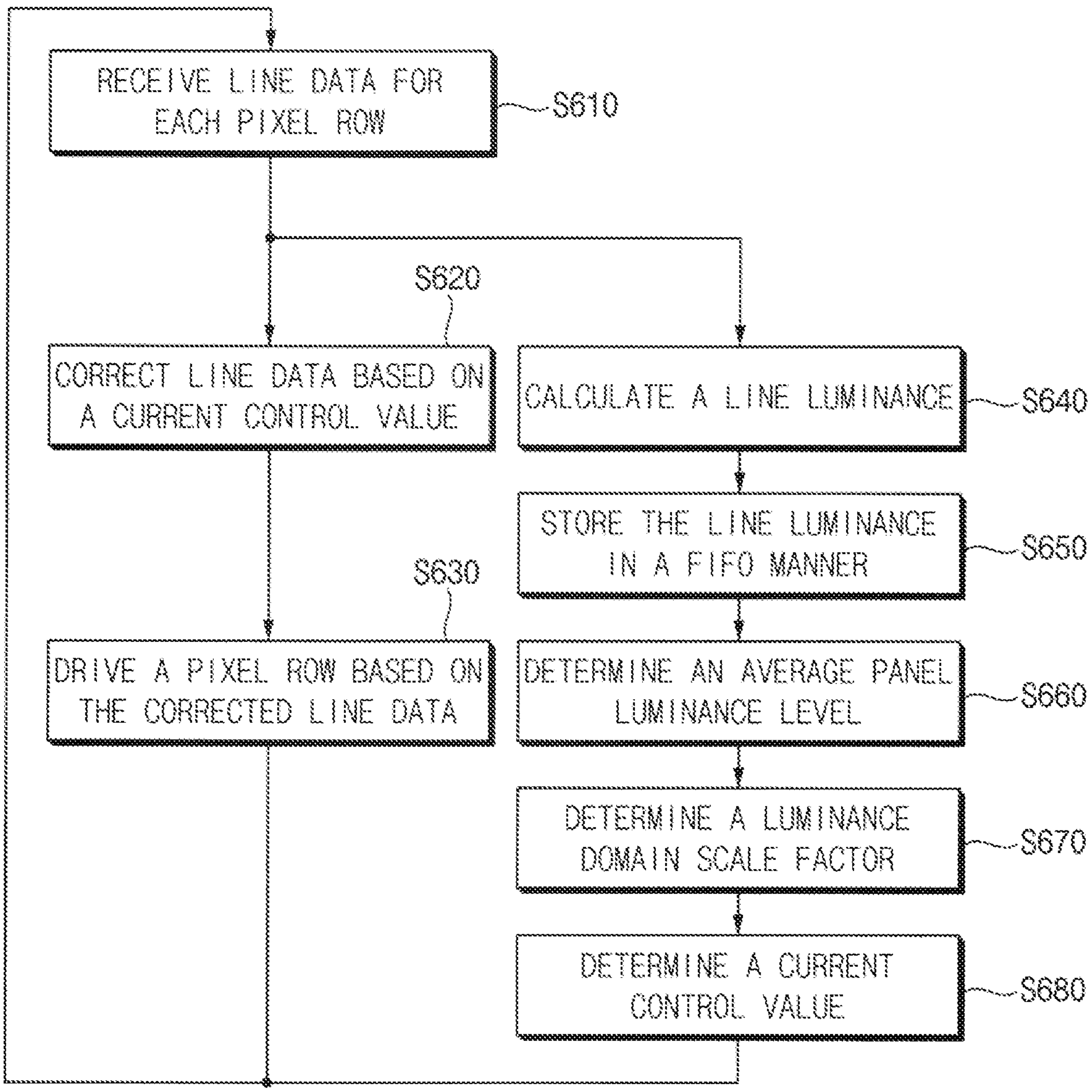
FIG. 10 is a flowchart illustrating a method of operating a display device according to embodiments of the present inventive concept.

FIG. 10 is a flowchart illustrating a method of operating a display device according to embodiments of the present inventive concept.

Referring to FIGS. 1, 3 and 10, in a method of operating a display device 100 according to embodiments of the present inventive concept, a panel driver 120 may receive K-th line data for a K-th pixel row in a current frame period (S610). When the K-th line data for the K-th pixel row are received, the panel driver 120 may correct the K-th line data based on a current control value CCV for the K-th pixel row determined when (K−1)-th line data are received in the current frame period (S620). The panel driver 120 may drive the K-th pixel row based on the corrected K-th line data (S630). Further, when the K-th line data for the K-th pixel row are received, the panel driver 120 may determine a current control value CCV for a (K+1)-th pixel row based on first line data LD1 through K-th line data received in the current frame period and the (K+1)-th line data through N-th line data LDN received in a previous frame period (S640 through S680).

In some embodiments of the present inventive concept, a gray-luminance converter 210 may convert gray levels represented by pixel data PXD included in the K-th line data into pixel luminances PXLUM for the K-th pixel row, and a line luminance calculator 220 may calculate a line luminance LLUM for the K-th pixel row by summing the pixel luminances PXLUM for the K-th pixel row (S640). An average luminance level determiner 230 may store the line luminance LLUM for the K-th pixel row in a FIFO manner (S650). For example, the average luminance level determiner 230 may remove the line luminance LLUM for the K-th pixel row stored in the previous frame period while storing the line luminance LLUM for the K-th pixel row in the current frame period. Further, the panel driver 120 may sequentially receive the first through the N-th line data LD1 through LDN for first through N-th pixel rows PXR1 through PXRN in each frame period, and the average luminance level determiner 230 may maintain N line luminances LLUM by storing the N line luminances LLUM for the first through the N-th pixel rows PXR1 through PXRN in the FIFO manner. The average luminance level determiner 230 may determine an average panel luminance level APL based on the N line luminances LLUM for the first through the N-th pixel rows PXR1 through PXRN (S660). A luminance domain scale factor determiner 240 may determine a luminance domain scale factor LDSF corresponding to the average panel luminance level APL (S670). A gray domain scale factor determiner 250 may convert the luminance domain scale factor LDSF into a gray domain scale factor GDSF, and may output the gray domain scale factor GDSF as the current control value CCV for the (K+1)-th pixel row (S680).

Thereafter, the panel driver 120 may receive the (K+1)-th line data for the (K+1)-th pixel row in the current frame period (S610), may correct the (K+1)-th line data based on the current control value CCV for the (K+1)-th pixel row determined when the K-th line data are received in the current frame period (S620), and may drive the (K+1)-th pixel row based on the corrected (K+1)-th line data (S630). Further, when the (K+1)-th line data for the (K+1)-th pixel row are received, the panel driver 120 may determine a current control value CCV for a (K+2)-th pixel row based on the first line data LD1 through the (K+1)-th line data received in the current frame period and (K+2)-th line data through the N-th line data LDN received in the previous frame period (S640 through S680).

This way, the panel driver 120 may sequentially receive the first through the N-th line data LD1 through LDN for the first through the N-th pixel rows PXR1 through PXRN in each frame period (S610), may correct current line data for a current pixel row based on a current control value CCV determined when previous line data for a previous pixel row are received (S620), and may sequentially drive the first through the N-th pixel rows PXR1 through PXRN based on the corrected first through N-th line data LD1 through LDN (S630). Further, the panel driver 120 may determine a current control value CCV for a next pixel row when the current line data for the current pixel row are received (S640 through S680), and may apply the current control value CCV to next line data for the next pixel row (S620). Thus, in the method of operating the display device 100 according to embodiments of the present inventive concept, there may be a delay of only one line or only one pixel row between determining the current control value CCV and applying the current control value CCV, and an overcurrent or a rush current caused by the delay between determining the current control value CCV and applying the current control value CCV may be prevented.

Figure 11:
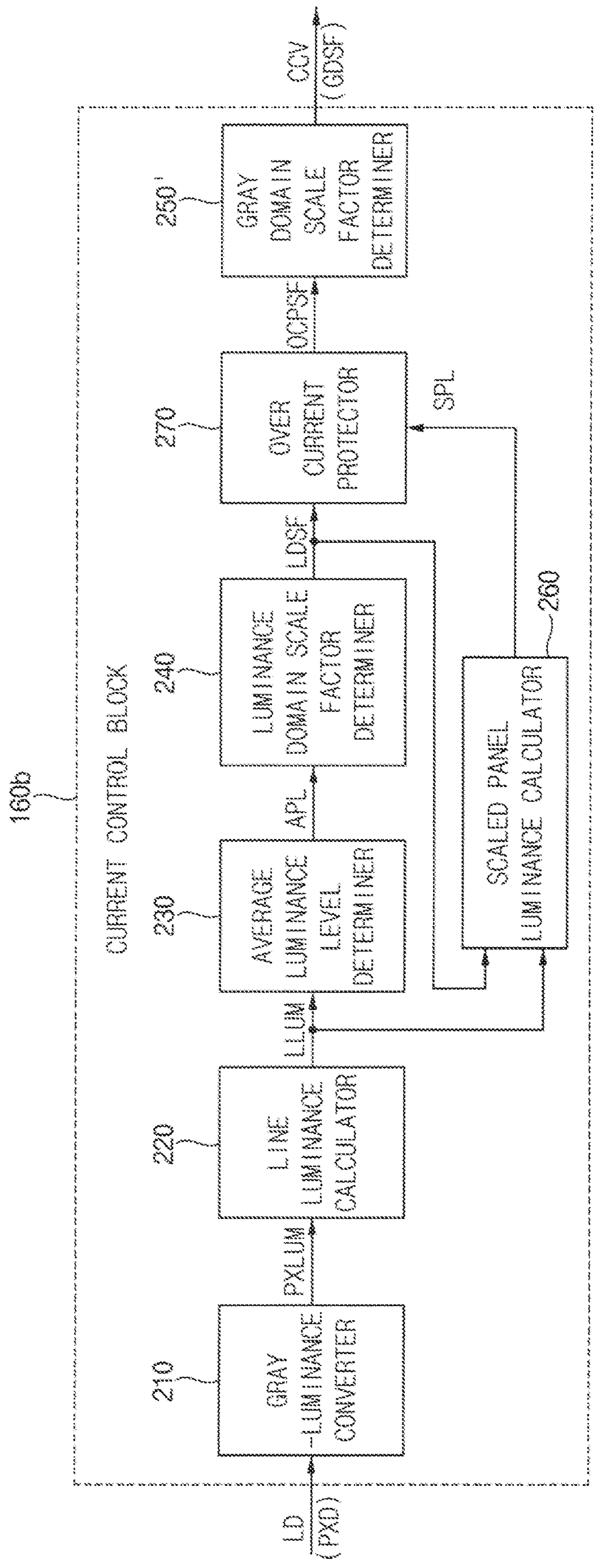
FIG. 11 is a block diagram illustrating a current control block according to embodiments of the present inventive concept.
Figure 12:
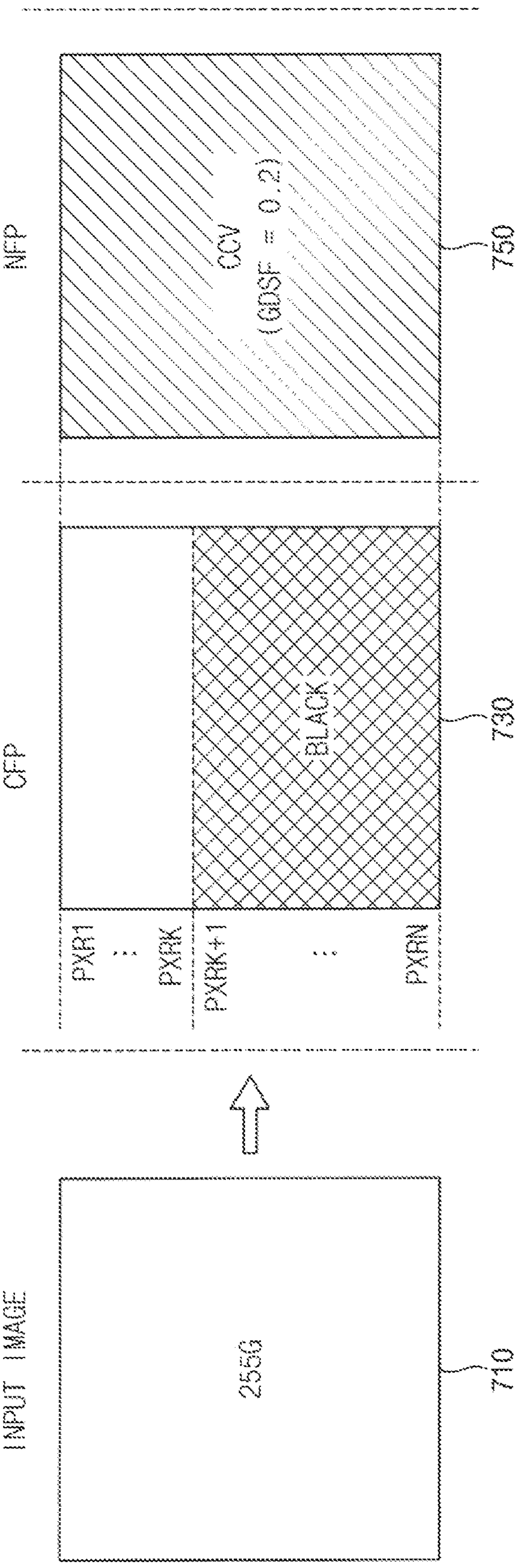
FIG. 12 is a diagram for describing an example of an operation of a current control block according to embodiments of the present inventive concept.
Figure 13:
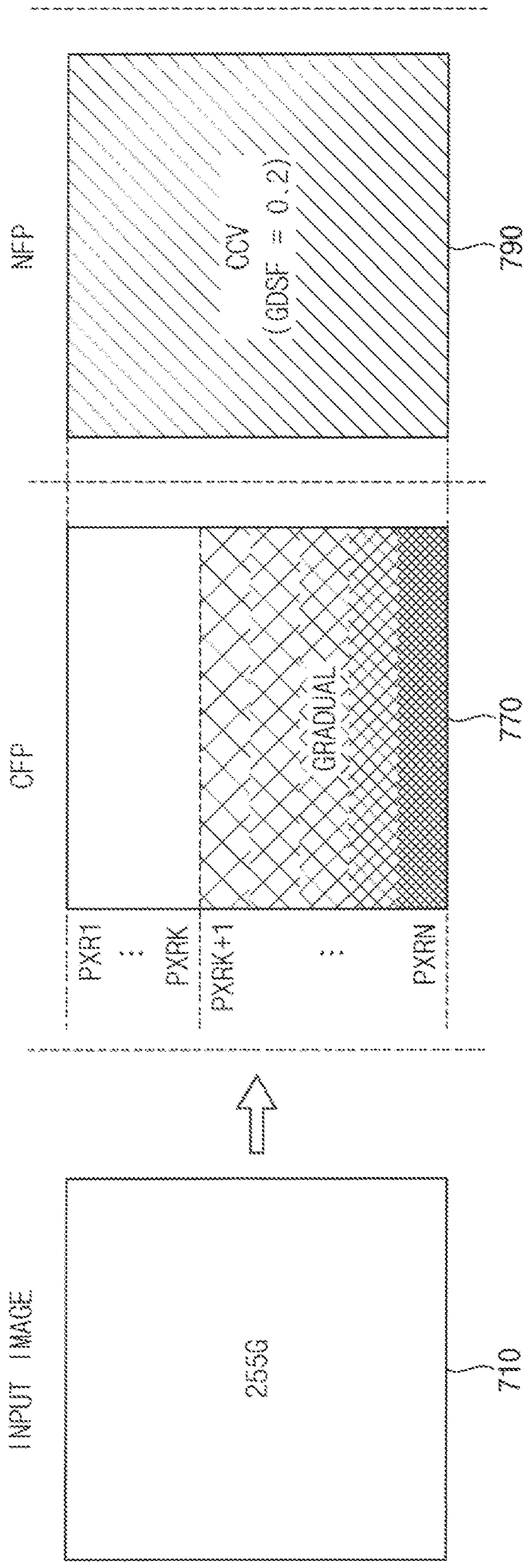
FIG. 13 is a diagram for describing an example of an operation of a current control block according to embodiments of the present inventive concept.

FIG. 11 is a block diagram illustrating a current control block according to embodiments of the present inventive concept, FIG. 12 is a diagram for describing an example of an operation of a current control block according to embodiments of the present inventive concept, and FIG. 13 is a diagram for describing an example of an operation of a current control block according to embodiments of the present inventive concept.

Referring to FIG. 11, a current control block 160*b* may include a gray-luminance converter 210, a line luminance calculator 220, an average luminance level determiner 230, a luminance domain scale factor determiner 240, a scaled panel luminance calculator 260, an overcurrent protector 270 and a gray domain scale factor determiner 250'. The current control block 160*b* of FIG. 11 may have a similar configuration and a similar operation to a current control block 160*a* of FIG. 3, except that the current control block 160*b* may further include the scaled panel luminance calculator 260 and the overcurrent protector 270. Each component of the current control block 160*b* may be implemented in a circuit.

The gray-luminance converter 210 may convert gray levels represented by pixel data PXD included in line data LD for each pixel row into pixel luminances PXLUM for each pixel row. The line luminance calculator 220 may calculate a line luminance LLUM for each pixel row by summing the pixel luminances PXLUM for each pixel row. The average luminance level determiner 230 may store line luminances LLUM for first through N-th pixel rows in a FIFO manner, and may determine an average panel luminance level APL based on the line luminances LLUM for the first through the N-th pixel rows. The luminance domain scale factor determiner 240 may determine a luminance domain scale factor LDSF corresponding to the average panel luminance level APL.

The scaled panel luminance calculator 260 may multiply the line luminances LLUM for the first through the N-th pixel rows by luminance domain scale factors LDSF for the first through the N-th pixel rows, respectively, and may calculate a scaled panel luminance SPL by summing results of the multiplication. For example, the luminance domain scale factor determiner 240 may output the luminance domain scale factor LDSF for a current pixel row when line data LID for a previous pixel row are received, the line luminance calculator 220 may output the line luminance LLUM for the current pixel row when the line data LD for the current pixel row are received, and the scaled panel luminance calculator 260 may multiply the line luminance LLUM for the current pixel row by the luminance domain scale factor LDSF for the current pixel row. Further, the luminance domain scale factor determiner 240 may output the luminance domain scale factor LDSF for a next pixel row when the line data LD for the current pixel row are received, the line luminance calculator 220 may output the line luminance LLUM for the next pixel row when the line data L) for the next pixel row are received, and the scaled panel luminance calculator 260 may multiply the line luminance LLUM for the next pixel row by the luminance domain scale factor LDSF for the next pixel row. This way, the scaled panel luminance calculator 260 may store N multiplication results for the first through the N-th pixel rows in a FIFO manner, and may calculate the scaled panel luminance SPL by summing the N multiplication results when each line data LD are received.

The overcurrent protector 270 may receive the scaled panel luminance SPL from the scaled panel luminance calculator 260, and may compare the scaled panel luminance SPL with a panel luminance limit value. When the scaled panel luminance SPL is less than or equal to the panel luminance limit value, the overcurrent protector 270 may output the luminance domain scale factor LDSF generated by the luminance domain scale factor determiner 240 as an overcurrent-protected scale factor OCPSF. Alternatively, when the scaled panel luminance SPL exceeds the panel luminance limit value, the overcurrent protector 270 may generate the overcurrent-protected scale factor OCPSF by decreasing the luminance domain scale factor LDSF output from the luminance domain scale factor determiner 240.

The gray domain scale factor determiner 250' may convert the overcurrent-protected scale factor OCPSF output from the overcurrent protector 270 into a gray domain scale factor GDSF, and may output the gray domain scale factor GDSF as a current control value CCV.

In some embodiments of the present inventive concept, in a case where the scaled panel luminance SPL exceeds the panel luminance limit value when the line data LD for the current pixel row are received, the overcurrent protector 270 may determine the overcurrent-protected scale factors OCPSF for pixel rows from the next pixel row to the last pixel row such that the current control values CCV for the pixel rows may become a minimum current control value. In some embodiments of the present inventive concept, the minimum current control value may be, but is not limited to, about 0. For example, as illustrated in FIG. 12, when input image data representing a black image are received in a previous frame period, and input image data representing a white image 710 (e.g., an image of a 255-gray level 255G) are received in a current frame period CFP, an overcurrent or a rush current may occur in the current frame period CFP in a conventional display device. However, in a display device according to embodiments of the present inventive concept, in the case where the input image data representing the black image are received in the previous frame period, and the input image data representing the white image 710 are received in the current frame period CFP, when line data LD for a K-th pixel row PXRK are received in the current frame period CFP, the scaled panel luminance SPL may exceed the panel luminance limit value. In this case, the overcurrent protector 270 may output the overcurrent-protected scale factors OCPSF having a value of 0 for (K+1)-th through N-th pixel rows PXRK+1 through PXRN, and the gray domain scale factor determiner 250' may output the current control values CCV having a value of 0 in response to the overcurrent-protected scale factors OCPSF having the value of 0. A data correction block 170 may correct line data LD for the (K+1)-th through the N-th pixel rows PXRK+1 through PXRN based on the current control values CCV having the value of 0 such that the line data LD represent a 0-gray level. Accordingly, the (K+1)-th through the N-th pixel rows PXRK+1 through PXRN may display a black image 730 in the current frame period CFP, and the overcurrent or the rush current may not occur in the current frame period CFP In a next frame period NFP, the scaled panel luminance SPL may be less than or equal to the panel luminance limit value, the current control block 160*b* may output the gray domain scale factor GDSF of about 0.2 as the current control value CCV, and a display panel 110 may display an image 750 in which the gray domain scale factor GDSF of about 0.2 is applied to input image data representing the white image 710.

In other embodiments of the present inventive concept, in a case where the scaled panel luminance SPL exceeds the panel luminance limit value when the line data LD for the current pixel row are received, the overcurrent protector 270 may determine the overcurrent-protected scale factors OCPSF for the pixel rows from the next pixel row to the last pixel row such that the current control values CCV for the pixel rows are gradually decreased to a target current control value. In some embodiments of the present inventive concept, the target current control value may be a current control value CCV corresponding to the white image 710. For example, the target current control value may be, but is not limited to, about 0.2. For example, as illustrated in FIG. 13, in the case where the input image data representing the black image are received in the previous frame period, and the input image data representing the white image 710 are received in the current frame period CFP, when the line data ID for the K-th pixel row PXRK are received in the current frame period CFP, the scaled panel luminance SPL may exceed the panel luminance limit value. In this case, the overcurrent protector 270 may output the overcurrent-protected scale factors OCPSF that are gradually decreased with respect to the (K+1)-th through the N-th pixel rows PXRK+1 through PXRN, and the gray domain scale factor determiner 250' may output the current control values CCV that are gradually decreased with respect to the (K+1)-th through the N-th pixel rows PXRK+1 through PXRN. The data correction block 170 may gradually decrease the line data LD for the (K+1)-th through the N-th pixel rows PXRK+1 through PXRN based on the current control values CCV that are gradually decreased. Accordingly, the (K+1)-th through the N-th pixel rows PXRK+1 through PXRN may display an image 770 of which a luminance is gradually decreased in the current frame period CFP, and the overcurrent or the rush current may not occur in the current frame period CFP In the next frame period NIP, the display panel 110 may display an image 790 in which the target current control value, or the gray domain scale factor GDSF of about 0.2 is applied to input image data representing the white image 710.

Figure 14:
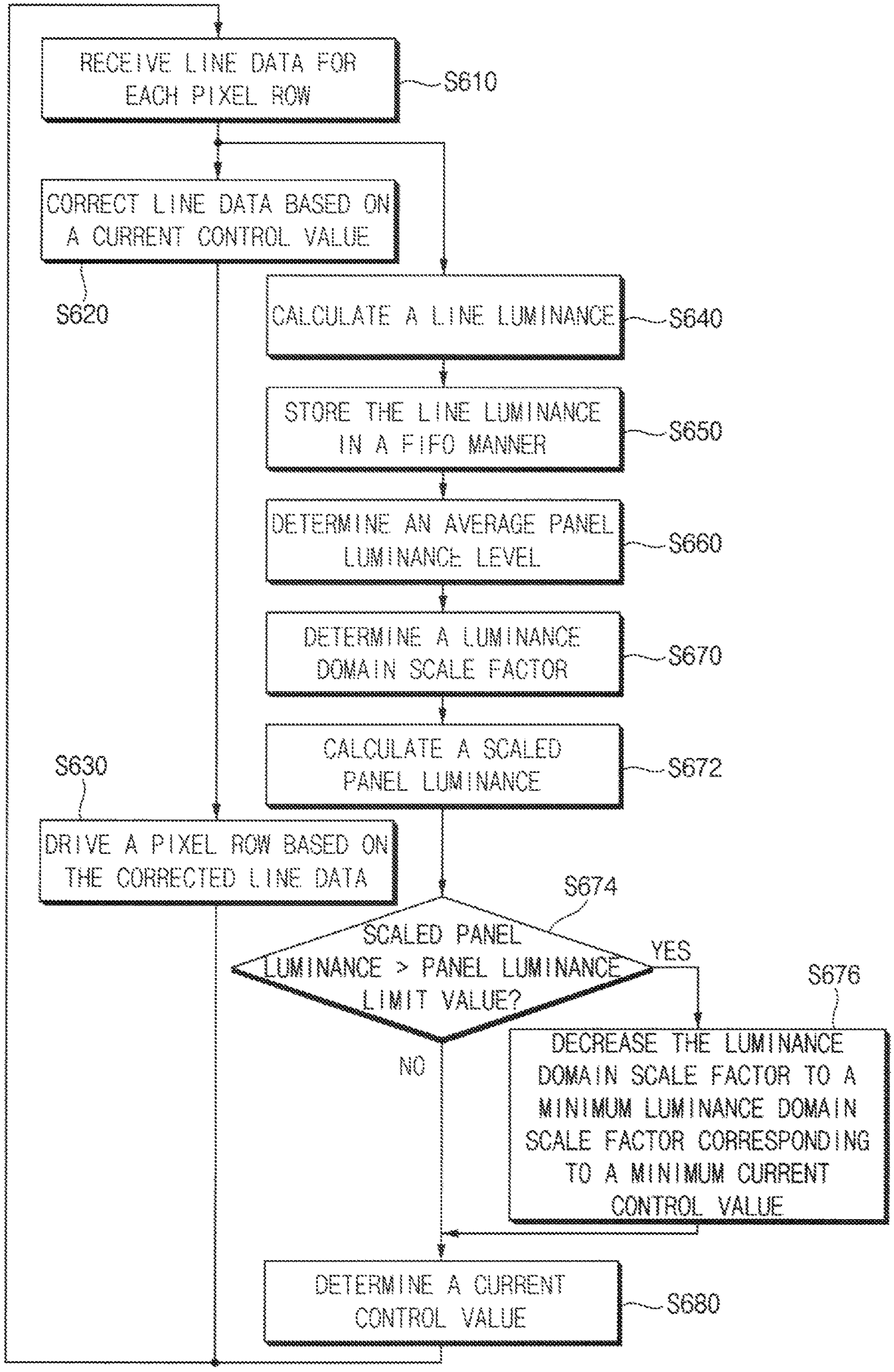
FIG. 14 is a flowchart illustrating a method of operating a display device according to embodiments of the present inventive concept.
Figure 15:
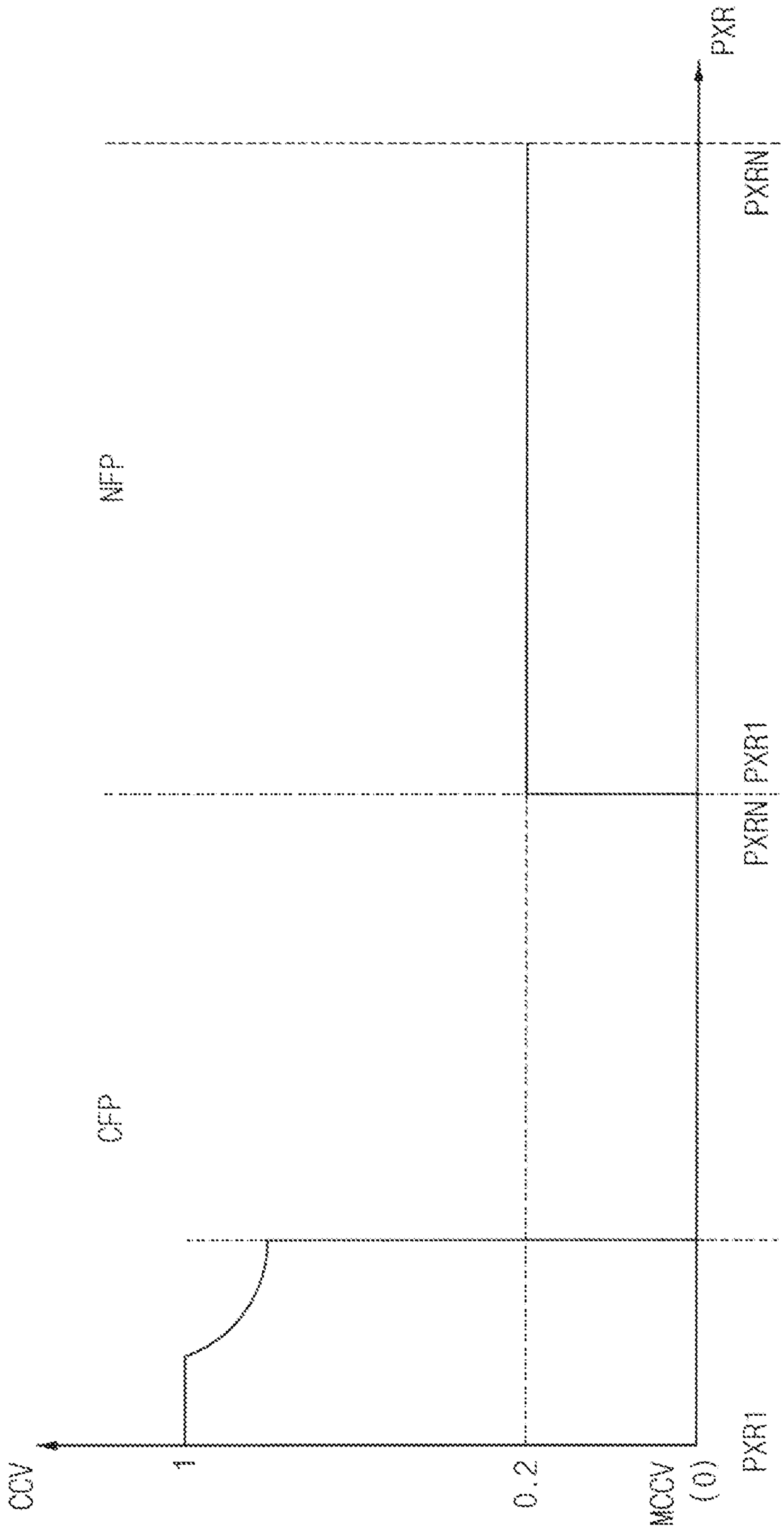
FIG. 15 is a diagram illustrating an example of a current control value according to embodiments of the present inventive concept.

FIG. 14 is a flowchart illustrating a method of operating a display device according to embodiments of the present inventive concept, and FIG. 15 is a diagram illustrating an example of a current control value according to embodiments of the present inventive concept.

A method illustrated in FIG. 14 may be substantially the same as a method illustrated in FIG. 10, except that a current control value is changed to a minimum current control value when a scaled panel luminance exceeds a panel luminance limit value.

Referring to FIGS. 1, 11 and 14, in a method of operating a display device 100 according to embodiments of the present inventive concept, a panel driver 120 may sequentially receive first through N-th line data LD1 through LDN for first through N-th pixel rows PXR1 through PXRN in each frame period (S610), may correct current line data for a current pixel row based on a current control value CCV determined when previous line data for a previous pixel row are received (S620), and may sequentially drive the first through the N-th pixel rows PXR1 through PXRN based on the corrected first through N-th line data LD1 through LDN (S630). Further, the panel driver 120 may determine a current control value CCV for a next pixel row when the current line data for the current pixel row are received (S640 through S680), and may apply the current control value CCV to next line data for the next pixel row (S620).

Further, when each line data LD are received, a scaled panel luminance calculator 260 may multiply line luminances LLUM for the first through the N-th pixel rows PXR1 through PXRN by luminance domain scale factors LDSF for the first through the N-th pixel rows PXR1 through PXRN, respectively, and may calculate a scaled panel luminance SPL by summing results of the multiplication (S672). For example, the scaled panel luminance calculator 260 may receive the line luminances LLUM from a line luminance calculator 220 and the luminance domain scale factors LDSF from a luminance domain scale factor determiner 240. When the scaled panel luminance SPL is less than or equal to the panel luminance limit value (S674: NO), a gray domain scale factor determiner 250' may output, as the current control value CCV a gray domain scale factor GDSF corresponding to a luminance domain scale factor LDSF generated by a luminance domain scale factor determiner 240 (S680).

Alternatively, when the scaled panel luminance SPL exceeds the panel luminance limit value (S674: YES), an overcurrent protector 270 may decrease the luminance domain scale factor LDSF to a minimum luminance domain scale factor (e.g., of about 0) corresponding to a minimum current control value (e.g., of about 0), and may output the minimum luminance domain scale factor as an overcurrent-protected scale factor OCPSF until a current frame period ends (S676). The gray domain scale factor determiner 250' may convert the minimum luminance domain scale factor into a gray domain scale factor GDSF, and may output the minimum current control value as the current control value CCV (S680).

For example, as illustrated in FIG. 15, in a case where input image data representing a black image are received in a previous frame period, and input image data representing a white image are received in a current frame period CFP, a current control block **160*b* may output a current control value CCV of about 1 with respect to a first pixel row PXR1, and may decrease the current control value CCV based on an average panel luminance level APL with respect to subsequent pixel rows. For example, the current control block 160*b* may output a current control value CCV with respect to a second pixel row PXR2 that is lower than the current control value CCV output with respect to the first pixel row PXR1. When the scaled panel luminance SPL may exceed the panel luminance limit value, the current control block 160*b*** may output the minimum current control value MCCV (e.g., of about 0) as the current control value CCV. Accordingly, an overcurrent or a rush current may be prevented. In the next frame period NFP, the current control value CCV output to the first through the N-th pixel rows PXR1 through PXRN may be 0.2.

Figure 16:
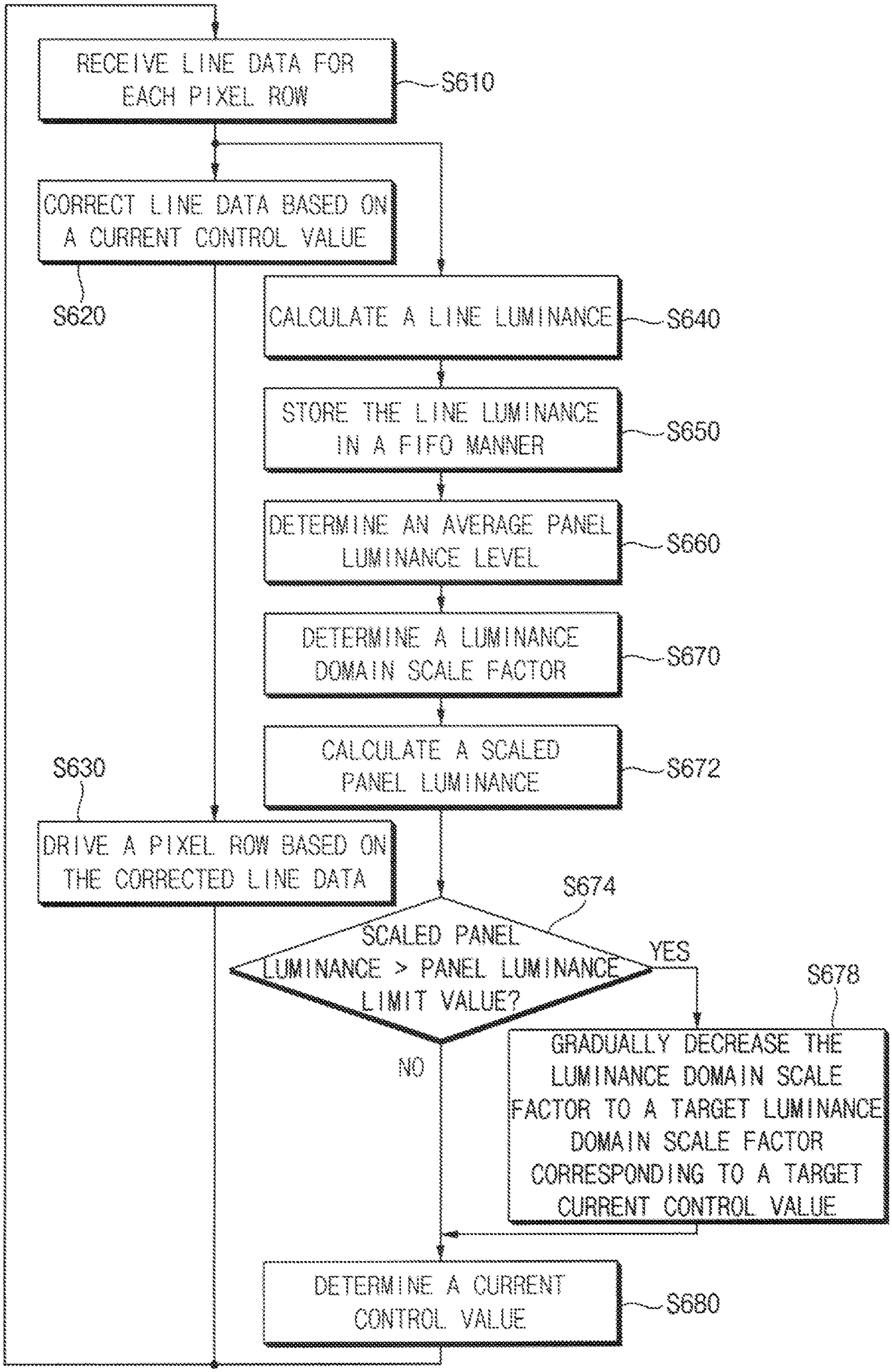
FIG. 16 is a flowchart illustrating a method of operating a display device according to embodiments of the present inventive concept.
Figure 17:
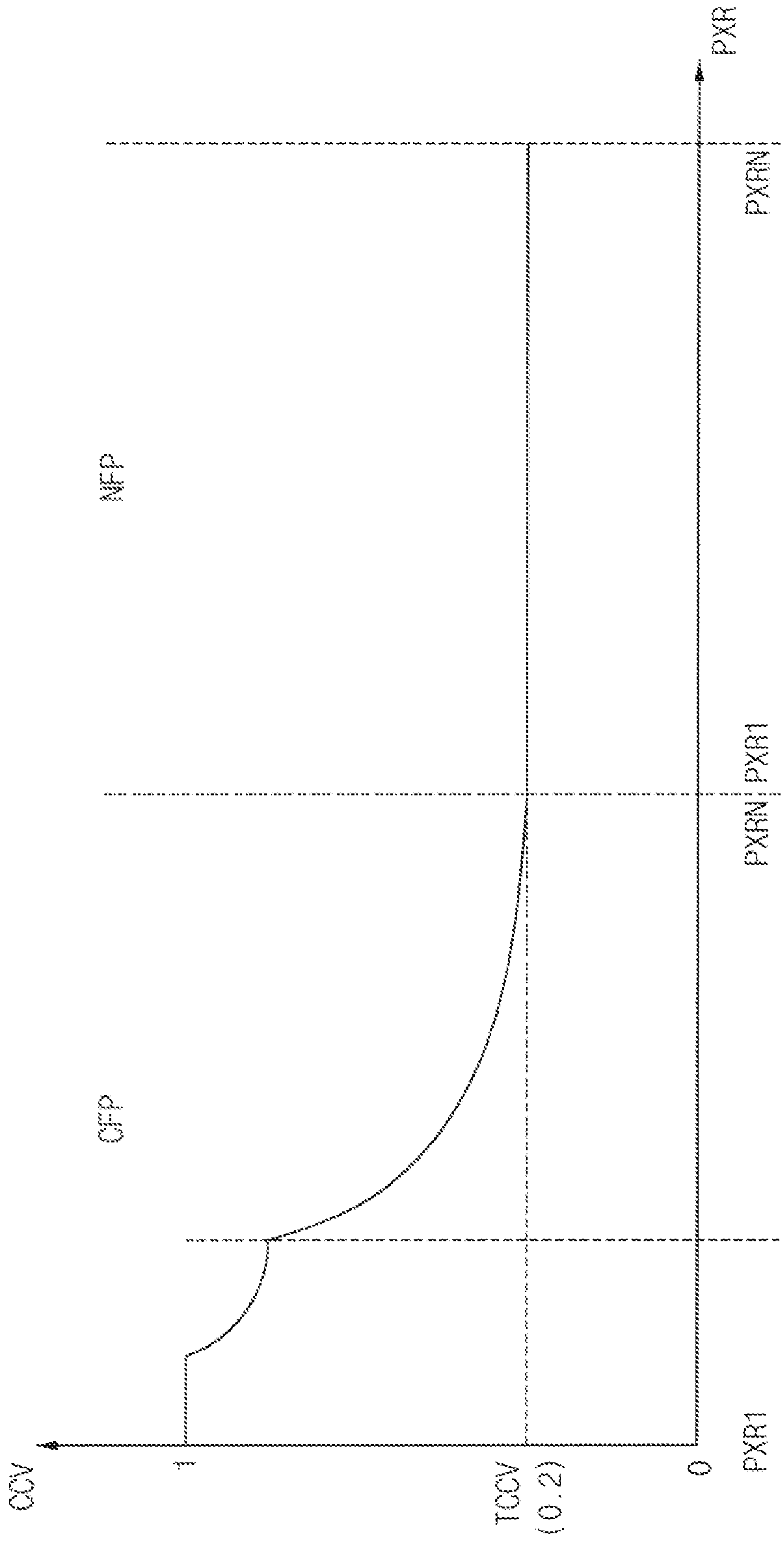
FIG. 17 is a diagram illustrating an example of a current control value according to embodiments of the present inventive concept.

FIG. 16 is a flowchart illustrating a method of operating a display device according to embodiments of the present inventive concept, and FIG. 17 is a diagram illustrating an example of a current control value according to embodiments of the present inventive concept.

A method illustrated in FIG. 16 may be substantially the same as a method illustrated in FIG. 10, except that a current control value is gradually decreased to a target current control value when a scaled panel luminance exceeds a panel luminance limit value.

Referring to FIGS. 1, 11 and 16, in a method of operating a display device 100 according to embodiments of the present inventive concept, a panel driver 120 may sequentially receive first through N-th line data LD1 through LDN for first through N-th pixel rows PXR1 through PXRN in each frame period (S610), may correct current line data for a current pixel row based on a current control value CCV determined when previous line data for a previous pixel row are received (S620), and may sequentially drive the first through the N-th pixel rows PXR1 through PXRN based on the corrected first through N-th line data LD1 through LDN (S630). Further, the panel driver 120 may determine a current control value CCV for a next pixel row when the current line data for the current pixel row are received (S640 through S680), and may apply the current control value CCV to next line data for the next pixel row (S620).

Further, when each line data LD are received, a scaled panel luminance calculator 260 may multiply line luminances LLUM for the first through the N-th pixel rows PXR1 through PXRN by luminance domain scale factors LDSF for the first through the N-th pixel rows PXR1 through PXRN, respectively, and may calculate a scaled panel luminance SPL by summing results of the multiplication (S672). When the scaled panel luminance SPL is less than or equal to the panel luminance limit value (S674: NO), a gray domain scale factor determiner 250' may output, as the current control value CCV, a gray domain scale factor GDSF corresponding to a luminance domain scale factor LDSF generated by a luminance domain scale factor determiner 240 (S680).

Alternatively, when the scaled panel luminance SPL exceeds the panel luminance limit value (S674: YES), an overcurrent protector 270 may gradually decrease the luminance domain scale factor LDSF to a target luminance domain scale factor corresponding to a target current control value (e.g., of about 0.2), and may output the gradually decreased luminance domain scale factor as an overcurrent-protected scale factor OCPSF until a current frame period ends (S678). The gray domain scale factor determiner 250' may convert the gradually decreased luminance domain scale factor into a gray domain scale factor GDSF, and may output the current control value CCV that is gradually decreased to the target current control value (S680).

For example, as illustrated in FIG. 17, in a case where input image data representing a black image are received in a previous frame period, and input image data representing a white image are received in a current frame period CFP, a current control block **160*b* may output a current control value CCV of about 1 with respect to a first pixel row PXR1, and may decrease the current control value CCV based on an average panel luminance level APL with respect to subsequent pixel rows. When the scaled panel luminance SPL may exceed the panel luminance limit value, the current control block 160*b*** may gradually decrease the current control value CCV to the target current control value TCCV (e.g., of about 0.2). For example, the current control value CCV may reach the target current control value TCCV (e.g., of about 0.2) near the end of the current frame period CFP. The current control value CCV gradually decreased to the target current control value TCCV may be lower than the current control value CCV determined according to the average panel luminance level APL. Accordingly, an overcurrent or a rush current may be prevented. In the next frame period NFP, the current control value CCV output to the first through the N-th pixel rows PXR1 through PXRN may be the target current control value TCCV (e.g., of about 0.2).

Figure 18:
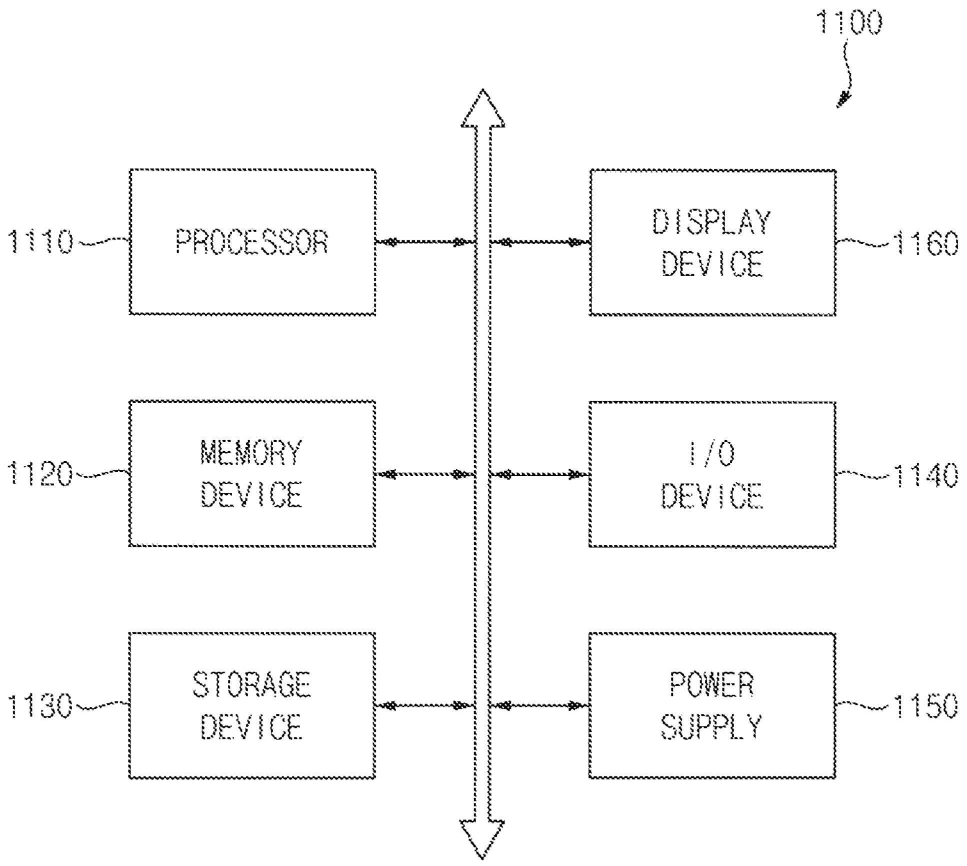
FIG. 18 is a block diagram illustrating an electronic device including a display device according to embodiments of the present inventive concept.

FIG. 18 is a block diagram illustrating an electronic device including a display device according to embodiments of the present inventive concept.

Referring to FIG. 18, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some embodiments of the present inventive concept, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100. The display device 1160 may be coupled to other components through the buses or other communication links.

In the display device 1160, when K-th line data for a K-th pixel row are received, a current control value for a (K+1)-th pixel row may be determined based on first through K-th line data received in a current frame period and (K+1)-th through N-th line data received in a previous frame period, and (K+1)-th line data may be corrected based on the current control value. Accordingly, an overcurrent caused by a delay between determining the current control value and applying the current control value may be prevented.

Embodiments of the present inventive concept may be applied any electronic device 1100 including the display device 1160. For example, the embodiments may be applied to a television (TV), a digital TV, a three-dimensional (3D) TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, etc.

The foregoing is illustrative of embodiments of the present inventive concept and is not to be construed as limiting thereof. Although a few embodiments have been described, those skilled in the art will readily appreciate that many modifications are possible without departing from the scope of the present inventive concept. Accordingly, all such modifications are intended to be included within the scope of the present inventive concept as set forth in the claims.

What is claimed is:

1. A display device, comprising:

a display panel including first through N-th pixel rows, where N is an integer greater than 1; and a panel driver configured to sequentially receive first through N-th line data for the first through the N-th pixel rows in each frame period, and to drive the display panel based on the first through the N-th line data, the panel driver including:

a current control circuit configured to determine a current control value for a (K+1)-th pixel row based on the first through K-th line data for the first through K-th pixel rows received in a current frame period and (K+1)-th through the N-th line data for the (K+1)-th through the N-th pixel rows received in a previous frame period, where K is an integer greater than 0 and less than or equal to N; and a data correction circuit configured to correct the (K+1)-th line data for the (K+1)-th pixel row based on the current control value in the current frame period, wherein the current control value is determined when the K-th line data for the K-th pixel row among the first through N-th pixel rows are received in the current frame period.

2. The display device of claim 1, wherein the current control circuit is configured to:

determine an average panel luminance level based on the first through the K-th line data received in the current frame period and the (K+1)-th through the N-th line data received in the previous frame period; and determine the current control value based on the average panel luminance level.

3. The display device of claim 2, wherein the current control circuit decreases the current control value as the average panel luminance level increases.

4. The display device of claim 1, wherein the current control circuit includes:

a gray-luminance converter configured to convert gray levels represented by pixel data included in the first through N-th line data for the first through the N-th pixel rows into pixel luminances for each of the first through the N-th pixel rows;

a line luminance calculator configured to calculate a line luminance for each of the first through the N-th pixel rows by summing the pixel luminances for each of the first through the N-th pixel rows;

an average luminance level determiner configured to store line luminances for the first through the N-th pixel rows in a first-in first-out (FIFO) manner, and to determine an average panel luminance level based on the line luminances for the first through the N-th pixel rows;

a luminance domain scale factor determiner configured to determine a luminance domain scale factor corresponding to the average panel luminance level; and a gray domain scale factor determiner configured to convert the luminance domain scale factor into a gray domain scale factor as the current control value.

5. The display device of claim 4, wherein the gray-luminance converter converts a gray level represented by each pixel data into a pixel luminance by using an equation "PXLUM=(Gray)^Gamma", where PXLUM represents the pixel luminance, Gray represents the gray level, and Gamma represents a gamma value of the display device.

6. The display device of claim 4, wherein the gray-luminance converter includes a gray-luminance lookup table that stores a plurality of pixel luminances corresponding to a plurality of gray levels, and wherein the gray-luminance converter converts a gray level represented by each pixel data into a pixel luminance by using the gray-luminance lookup table.

7. The display device of claim 4, wherein the average luminance level determiner includes:

a FIFO memory configured to store the line luminances for the first through the N-th pixel rows, the FIFO memory configured to remove a previous line luminance for a current pixel row stored in the previous frame period while storing a current line luminance for the current pixel row in the current frame period; and an average luminance level calculator configured to calculate a panel luminance by summing the line luminances stored in the FIFO memory, and to determine the average panel luminance level by dividing the panel luminance by a maximum panel luminance.

8. The display device of claim 4, wherein the luminance domain scale factor determiner is configured to:

determine the luminance domain scale factor as a maximum luminance domain scale factor when the average panel luminance level is less than a reference luminance level; and decrease the luminance domain scale factor as the average panel luminance level increases when the average panel luminance level is greater than or equal to the reference luminance level.

9. The display device of claim 4, wherein the gray domain scale factor determiner converts the luminance domain scale factor into the gray domain scale factor by using an equation "GDSF=(LDSF)^(1/Gamma)", where GDSF represents the gray domain scale factor, LDSF represents the luminance domain scale factor, and Gamma represents a gamma value of the display device.

10. The display device of claim 4, wherein the gray domain scale factor determiner includes a luminance-gray scale factor lookup table that stores a plurality of gray domain scale factors corresponding to a plurality of luminance domain scale factors, and wherein the gray domain scale factor determiner converts the luminance domain scale factor into the gray domain scale factor by using the luminance-gray scale factor lookup table.

11. The display device of claim 1, wherein the data correction circuit is configured to:

receive a gray domain scale factor as the current control value; and multiply pixel data included in the (K+1)-th line data by the gray domain scale factor to correct the (K+1)-th line data.

12. The display device of claim 1, wherein the current control circuit is configured to:

calculate a scaled panel luminance based on line luminances for the first through the N-th pixel rows and luminance domain scale factors for the first through the N-th pixel rows;

compare the scaled panel luminance with a panel luminance limit value; and decrease the current control value when the scaled panel luminance exceeds the panel luminance limit value.

13. The display device of claim 12, wherein, in a case where the scaled panel luminance exceeds the panel luminance limit value when the K-th line data are received, the current control circuit determines the current control values for the (K+1)-th through the N-th pixel rows in the current frame period as a minimum current control value.

14. The display device of claim 12, wherein, in a case where the scaled panel luminance exceeds the panel luminance limit value when the K-th line data are received, the current control circuit decreases the current control values for the (K+1)-th through the N-th pixel rows in the current frame period to a target current control value.

15. The display device of claim 1, wherein the current control circuit includes:

a gray-luminance converter configured to convert gray levels represented by pixel data included in the first through N-th line data for the first through the N-th pixel rows into pixel luminances for each of the first through the N-th pixel rows;

a line luminance calculator configured to calculate a line luminance for each of the first through the N-th pixel rows by summing the pixel luminances for each of the first through the N-th pixel rows;

an average luminance level determiner configured to store line luminances for the first through the N-th pixel rows in a first-in first-out (FIFO) manner, and to determine an average panel luminance level based on the line luminances for the first through the N-th pixel rows;

a luminance domain scale factor determiner configured to determine a luminance domain scale factor corresponding to the average panel luminance level;

a scaled panel luminance calculator configured to multiply the line luminances for the first through the N-th pixel rows by luminance domain scale factors for the first through the N-th pixel rows, respectively, and to calculate a scaled panel luminance by summing results of the multiplication;

an overcurrent protector configured to compare the scaled panel luminance with a panel luminance limit value, and to decrease the luminance domain scale factor output from the luminance domain scale factor determiner when the scaled panel luminance exceeds the panel luminance limit value; and a gray domain scale factor determiner configured to convert the luminance domain scale factor output from the overcurrent protector into a gray domain scale factor as the current control value.

16. A display device, comprising:

a display panel including first through N-th pixel rows, where N is an integer greater than 1; and a panel driver configured to sequentially receive first through N-th line data for the first through the N-th pixel rows in each frame period, and to drive the display panel based on the first through the N-th line data, the panel driver including:

a current control circuit configured to determine an average panel luminance level based on the first through K-th line data for the first through K-th pixel rows received in a current frame period and (K+1)-th through the N-th line data for (K+1)-th through the N-th pixel rows received in a previous frame period, and to determine a scale factor for the (K+1)-th pixel row based on the average panel luminance level, where K is an integer greater than 0 and less than or equal to N; and a data correction circuit configured to correct the (K+1)-th line data for the (K+1)-th pixel row based on the scale factor in the current frame period, wherein the scale factor is determined when the K-th line data for the K-th pixel row among the first through N-th pixel rows are received in the current frame period.

17. The display device of claim 16, wherein the current control circuit decreases the scale factor as the average panel luminance level increases.

18. The display device of claim 16, wherein the data correction circuit multiplies pixel data included in the (K+1)-th line data by the scale factor to correct the (K+1)-th line data.

19. A display device, comprising:

a display panel including a plurality of pixel rows arranged in sequence; and a panel driver configured to sequentially receive a plurality of line data for the pixel rows in each frame period, and to drive the display panel based on the line data, the panel driver including:

a current control circuit configured to determine a current control value for a specific pixel row based on line data received for the pixel rows arranged before the specific pixel row in a current frame period, line data received for the specific pixel row in a previous frame period and line data received for pixel rows arranged after the specific pixel row in the previous frame period; and a data correction circuit configured to correct the line data for the specific pixel row based on the current control value in the current frame period, wherein the current control circuit includes:

a gray-luminance converter configured to convert gray levels represented by pixel data included in first through N-th line data of the plurality of line data for first through N-th pixel rows of the pixel rows into pixel luminances for each of the first through the N-th pixel rows, where N is an integer greater than 1;

a line luminance calculator configured to calculate a line luminance for each of the first through the N-th pixel rows by summing the pixel luminances for each of the first through the N-th pixel rows;

an average luminance level determiner configured to store line luminances for the first through the N-th pixel rows in a first-in first-out (FIFO) manner, and to determine an average panel luminance level based on the line luminances for the first through the N-th pixel rows;

a luminance domain scale factor determiner configured to determine a luminance domain scale factor corresponding to the average panel luminance level; and a gray domain scale factor determiner configured to convert the luminance domain scale factor into a gray domain scale factor as the current control value.

* * * * *